United States Patent
Potnuru et al.

(10) Patent No.: US 12,188,358 B2
(45) Date of Patent: Jan. 7, 2025

(54) SEAL ASSEMBLY FOR A ROTARY MACHINE

(71) Applicant: General Electric Company, Schenectady, NY (US)

(72) Inventors: Santosh Potnuru, Bengaluru (IN); Pradeep Hemant Sangli, Bengaluru (IN); Ravindra Shankar Ganiger, Bengaluru (IN); Praveen Sharma, Bengaluru (IN); Scott Alan Schimmels, Miamisburg, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/325,621

(22) Filed: May 30, 2023

(65) Prior Publication Data

US 2024/0401494 A1   Dec. 5, 2024

(51) Int. Cl.
*F01D 11/08*  (2006.01)
*F01D 11/02*  (2006.01)
*F03G 7/06*   (2006.01)

(52) U.S. Cl.
CPC .............. *F01D 11/08* (2013.01); *F01D 11/02* (2013.01); *F01D 11/025* (2013.01); *F03G 7/0614* (2021.08); *F05D 2220/32* (2013.01); *F05D 2240/55* (2013.01); *F05D 2300/5021* (2013.01); *F05D 2300/505* (2013.01)

(58) Field of Classification Search
CPC ........ F01D 11/001; F01D 11/08; F01D 11/02; F01D 11/025; F01D 11/12; F01D 11/16; F01D 11/18
See application file for complete search history.

(56) References Cited

U.S. PATENT DOCUMENTS

| | | | |
|---|---|---|---|
| 6,543,992 B2 | 4/2003 | Webster | |
| 7,004,047 B2 | 2/2006 | Rey et al. | |
| 7,367,776 B2 | 5/2008 | Albers et al. | |

(Continued)

FOREIGN PATENT DOCUMENTS

| | | | |
|---|---|---|---|
| CN | 214118340 U | * | 9/2021 |
| EP | 2239423 A1 | | 10/2010 |

(Continued)

OTHER PUBLICATIONS

English Translation of CN214118340U (Year: 2021).*
English Translation of WO0070192A1 (Year: 2000).*

*Primary Examiner* — Woody A Lee, Jr.
*Assistant Examiner* — Wesley Le Fisher
(74) *Attorney, Agent, or Firm* — Venable LLP; David D. Leege; Michele V. Frank

(57) ABSTRACT

A seal assembly for a rotary machine. The seal assembly includes a rotor and a stator. The rotor is rotatable about a rotational axis and has a rotor seal face. The stator has a stator seal face. The stator seal face is positioned opposite the rotor seal face and faces the rotor seal face with a gap therebetween. A portion of one of the rotor and the stator is formed of (i) a shape memory alloy or (ii) a first metal and a second metal with the second metal having a coefficient of thermal expansion different from the first metal. The seal assembly is characterized by a seal clearance compliance ratio (SCCR) from 20% to 90%.

20 Claims, 10 Drawing Sheets

(56) References Cited

U.S. PATENT DOCUMENTS

| | | | |
|---|---|---|---|
| 7,448,849 B1* | 11/2008 | Webster | F01D 11/22 |
| | | | 415/128 |
| 8,136,999 B2 | 3/2012 | Mons et al. | |
| 8,291,710 B2 | 10/2012 | Webster | |
| 8,430,622 B2 | 4/2013 | Webster et al. | |
| 8,500,406 B2 | 8/2013 | Jiménez et al. | |
| 8,662,756 B2 | 3/2014 | Care et al. | |
| 8,830,026 B2 | 9/2014 | Mooney et al. | |
| 8,985,938 B2 | 3/2015 | Petty | |
| 9,890,868 B2 | 2/2018 | Diaz et al. | |
| 9,963,988 B2* | 5/2018 | Swedowicz | F01D 11/18 |
| 10,415,418 B2 | 9/2019 | McCaffrey et al. | |
| 2015/0144256 A1 | 5/2015 | Fabre et al. | |
| 2022/0154580 A1* | 5/2022 | Ganiger | F16F 1/22 |
| 2023/0106380 A1* | 4/2023 | Bidkar | F01D 11/025 |
| | | | 415/173.2 |

FOREIGN PATENT DOCUMENTS

| | | | | |
|---|---|---|---|---|
| JP | S57195803 A | 12/1982 | | |
| JP | 2515605 B2 | 7/1996 | | |
| WO | WO-0070192 A1 * | 11/2000 | | F01D 11/005 |
| WO | 2010112421 A1 | 10/2010 | | |
| WO | WO-2021201828 A1 * | 10/2021 | | F01D 11/025 |

* cited by examiner

SEAL ASSEMBLY FOR A ROTARY MACHINE

TECHNICAL FIELD

The present disclosure relates to rotor seals, particularly, rotor seals used in rotary machines, such as, those used in gas turbine engines for aircraft.

BACKGROUND

Gas turbine engines, particularly, those used in aircraft, are rotary engines having a turbomachine where working air serially flows through a compressor section, a combustor section, and a turbine section. The working air is compressed in the compressor section. The compressed working air is then mixed with fuel and combusted in the combustor section, generating combustion products. The combustion products are then used to drive turbines of the turbine section. The compressor section and the turbine section may each include a plurality of stages. The turbomachine includes at least one shaft connecting, for example, turbine blades with compressor blades such that rotation of the turbine blades drives the rotation of the compressor blades during operation. Bearings support the rotating shaft and may be located within a housing including lubricating oil. Seal assemblies may be used in the turbomachine between rotating components, such as the shaft, and stationary components, such portions of the bearing housing, to reduce the leakage of fluids, such as air or oil between the rotating components and stationary components.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 10A shows one configuration for regulating the temperature of the seal assembly, and FIG. 10B shows another figuration for regulating the temperature of the seal assembly.

DETAILED DESCRIPTION

Figure 1:
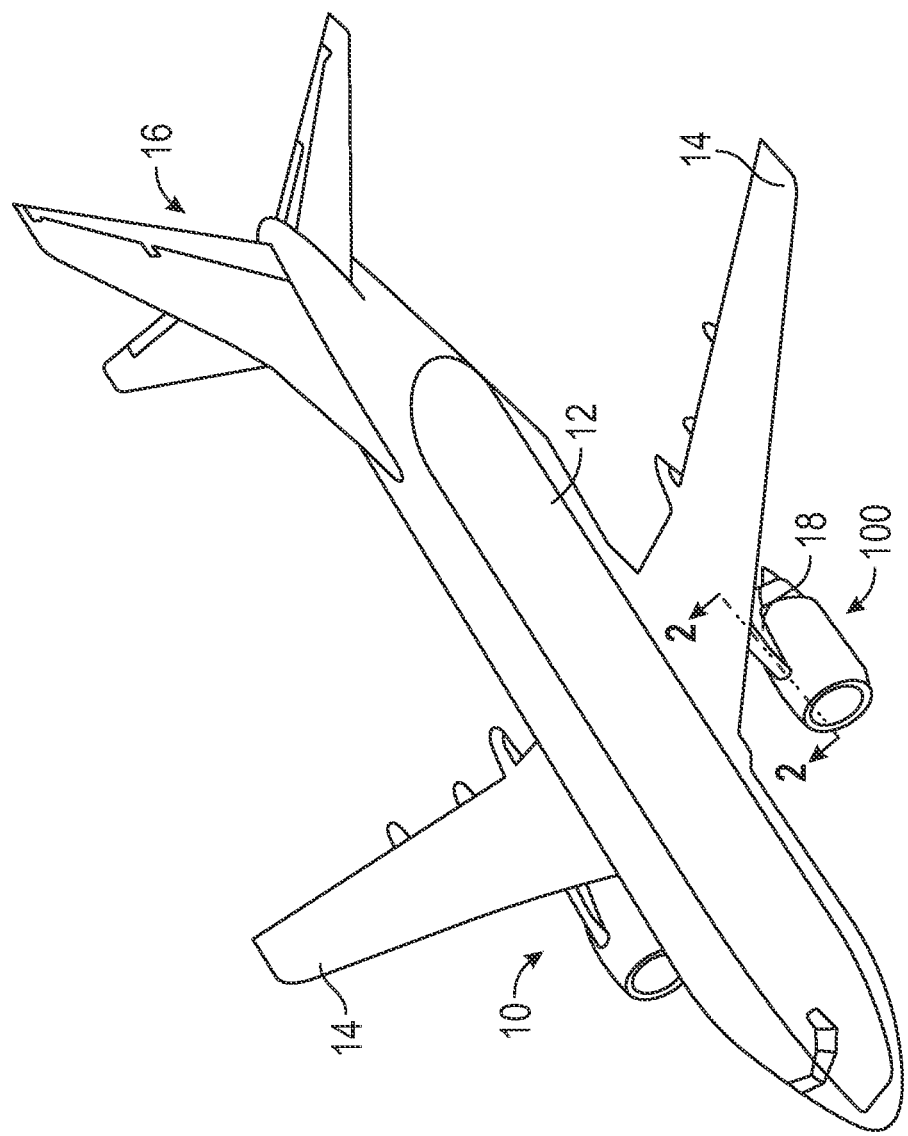
FIG. 1 is a schematic view of an aircraft having gas turbine engines that may implement various embodiments of the present disclosure.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Here and throughout the specification and the claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, gas turbine engines used in aircraft are rotary engines and are an example of rotary machines. The gas turbine engine, particularly, the turbomachine of the gas turbine engine, includes components that rotate. The rotating components of the turbomachine include, for example, compressor blades and turbine blades, each of which may extend radially outward from a rotating disk connected to a rotating shaft. Such rotating components, including the shaft, may be referred to herein as rotors. Other components of the turbomachine do not rotate, but, rather, are static or stationary relative to the rotation discussed above. Such components may be referred to herein as stators and include, for example, bearing housings for the bearings supporting the rotating shaft. Seals may be formed between the stator, such as the bearing housing, and the rotor, such as the shaft, to prevent or otherwise to minimize leakage between the stator and the rotor. Such seals may be referred to herein as rotating seals or seal assemblies.

The seal assembly may include a portion on the rotor (rotor seal) and a portion on the stator (stator seal). The rotor seal and the stator seal may be positioned relative to each other with a gap formed therebetween. This gap may also be referred to as the seal clearance. Some rotary machines, such as a gas turbine engine, particularly, the turbomachine of the gas turbine engine, experience large variations in operating conditions. The turbomachine of the gas turbine engine used in aircraft may, for example, undergo large changes in both temperature and rotational speed of the rotor. These seal assemblies may be at ambient temperature when starting up but have temperatures of three hundred degrees Fahrenheit (300° F.) (two hundred sixty degrees Celsius (260° C.)) or greater during operation for forward sumps or temperatures of five hundred degrees Fahrenheit (500° F.) (two hundred sixty degrees Celsius (260° C.)) or greater during operation for aft sumps. Similarly, the rotor can increase speed from stationary to speeds of forty-five thousand revolutions per minute (45000 rpm) or greater. Such great changes in the operating conditions can result in significant relative movement of the rotor seal and the stator seal, resulting in significant changes in the gap.

Because the rotating seals are designed to accommodate such a great change in operating conditions, the clearance (gap) at assembly (ambient conditions) may be relatively large, resulting in an undesirable leakage though the rotating seal, and undesirable leakage rates through the rotating seal at other operating conditions. Some seals have a differential pressure requirement across the seal, with a high radial clearance at these lower temperature and speed conditions, the leakage rate can make it difficult to meet these differential pressure requirements. Such leakage can require greater air flows (such as vent flows) to compensate for this leakage. If the rotating seal is a seal for a sump, such as a sump for a bearing supporting the shaft, these effects can result in higher oil consumption and larger vent system sizing for a vented sump and higher required scavenge capacity for a non-vented sump. At the other end of the operating conditions (e.g., high speed or temperature), the clearance (gap) may even be eliminated, resulting in undesirable wear of the rotor seal and the stator seal, and reducing the life of the rotor seal. Replacing these rotating seals in gas turbine engines, for example, can be expensive and time consuming, and can require excessive downtime of components. In addition, there may be some components where such maintenance is not possible.

The inventors set out to develop seal assemblies for rotary machines, such as gas turbine engines, that are compliant and are designed to control the seal clearances and, thus, leakage, throughout the range of operating conditions. The seal assemblies of the embodiments discussed herein include components or portions thereof that are formed of a shape memory alloy (SMA) or bimetallic materials. The shape memory alloy or the bimetallic component is tuned for the operational range of the seal assembly to control the seal clearance (gap) throughout the operational range. The change in the gap can thus be more constant, and, thus, the leakage rate is more constant, avoiding the issues discussed above. As will be discussed in more detail below, during the course of evaluating the variations possible in the design, including the effectiveness and the reliability or efficiency in maintaining an appropriate and a more constant clearance over the entire operating temperate range, the inventors, discovered, unexpectedly, that there exists a relationship among select features of the seal assembly that produced superior results over the other numerous other designs considered.

FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12. Although the aircraft 10 shown in FIG. 1 is an airplane, the embodiments described herein may also be applicable to other aircraft 10, including, for example, helicopters and unmanned aerial vehicles (UAV). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
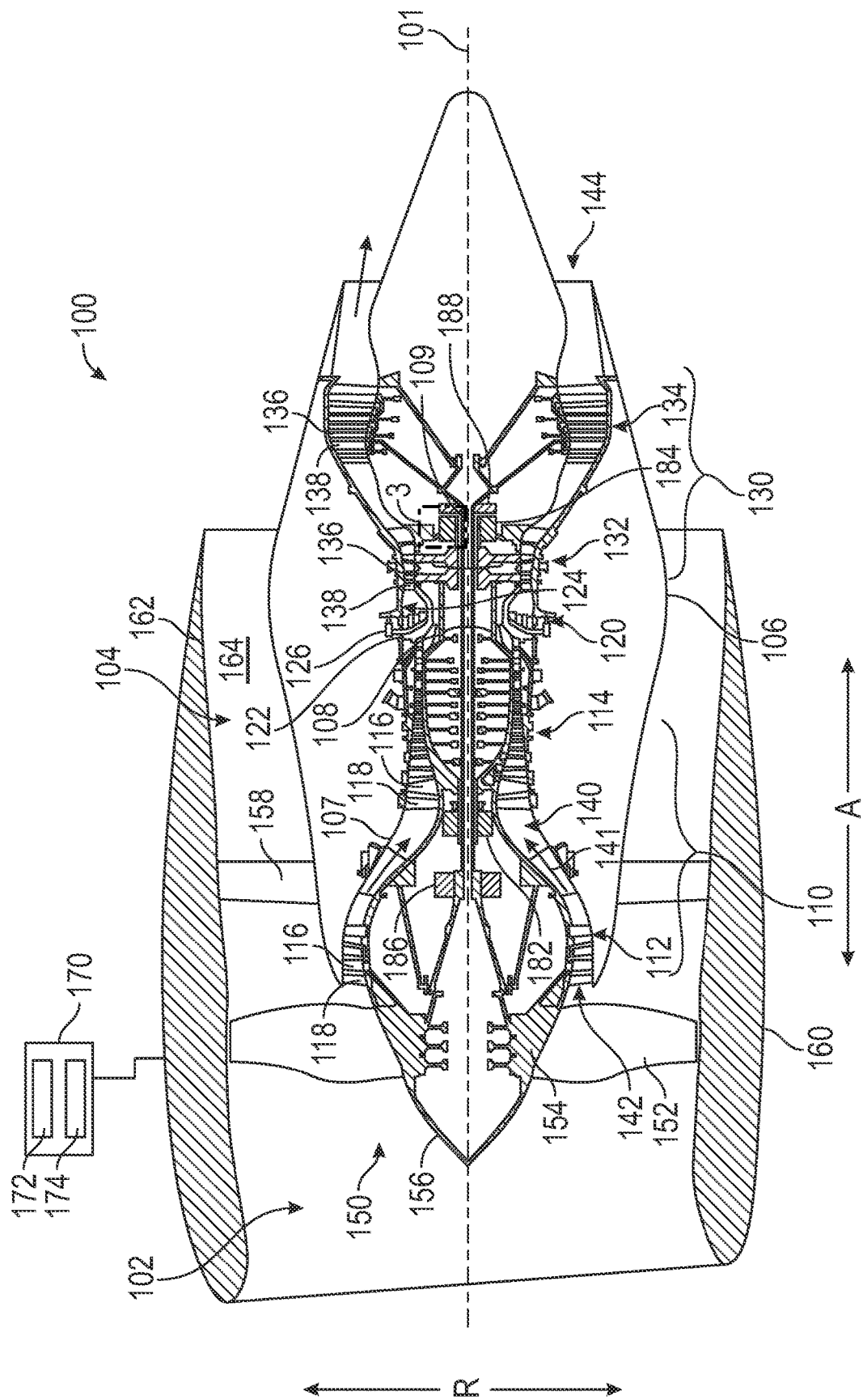
FIG. 2 is a schematic, cross-sectional view, taken along line 2-2 in FIG. 1, of one of the gas turbine engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. The engine 100 has a longitudinal axial direction A (extending parallel to a longitudinal centerline 101, shown for reference in FIG. 2), a radial direction R, and a circumferential direction C. The circumferential direction C (not depicted in FIG. 2, see FIG. 11) extends in a direction of rotation about the longitudinal centerline 101 (the axial direction A). In the embodiment depicted in FIG. 2, the engine 100 is a gas turbine engine and, more specifically, a high bypass turbofan engine, including a fan section 102 and a turbomachine 104 disposed downstream from the fan section 102.

The turbomachine 104 depicted in FIG. 2 includes a tubular outer casing 106 (also referred to as a housing or a nacelle) that defines an inlet 142. The inlet 142 may be annular. The outer casing 106 encases an engine core that includes, in a serial flow relationship, a compressor section 110 including a booster or a low-pressure (LP) compressor 112 and a high-pressure (HP) compressor 114, a combustion section 120, a turbine section 130 including a high-pressure (HP) turbine 132 and a low-pressure (LP) turbine 134, and a jet exhaust nozzle section 144. The compressor section 110, the combustion section 120, and the turbine section 130 together define at least in part a core air flow path 140 extending from the inlet 142 to the jet exhaust nozzle section 144, and through which air (a working air 141) flows.

Each of the LP compressor 112 and the HP compressor 114 may include a plurality of compressor stages. In each stage, a set of compressor blades 116 rotate relative to a corresponding set of static compressor vanes 118 (also called a nozzle) to compress or to pressurize the working air 141 passing through the stage. In a single compressor stage, a plurality of compressor blades 116 can be provided in a ring, extending radially outwardly relative to the longitudinal centerline 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. Each compressor stage may be used to sequentially compress the air (working air 141) flowing through the core air flow path 140. Any suitable number of compressor blades 116, compressor vanes 118, and compressor stages may be used.

Each of the HP turbine 132 and the LP turbine 134 also may include a plurality of turbine stages. In each stage, a set of turbine blades 136 rotate relative to a corresponding set of static turbine vanes 138 (also called a nozzle) to extract energy from the combustion products passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown) including a fuel source, is injected into a combustion chamber 124 of a combustor 122 by fuel nozzles 126. The fuel is mixed with compressed air from the compressor section 110 to form a fuel and air mixture, and combusted, generating combustion products (combustion gases). Adjusting a fuel metering unit (not shown) of the fuel system changes the volume of fuel provided to the combustion chamber 124 and, thus, changes the amount of propulsive thrust produced by the engine 100 to propel the aircraft 10. The combustion gases are discharged from the combustion chamber 124. These combustion gases may be directed into the turbine blades 136 of the HP turbine 132 and, then, the turbine blades 136 of the LP turbine 134, and the combustion gases drive (rotate) the turbine blades 136 of the HP turbine 132 and the LP turbine 134. Any suitable number of turbine blades 136, turbine vanes 138, and compressor stages may be used.

The engine 100 (turbomachine 104) further includes one or more drive shafts. More specifically, the engine 100 includes a high-pressure (HP) shaft 108 drivingly connecting the HP turbine 132 to the HP compressor 114, and a low-pressure (LP) shaft 109 drivingly connecting the LP turbine 134 to the LP compressor 112. The HP shaft 108 and the LP shaft 109 may also be referred to as spools. More specifically, the turbine rotors of the HP turbine 132 are connected to the HP shaft 108, and the compressor rotors of the HP compressor 114 are connected to the HP shaft 108. When the turbine blades 136 and, thus, the turbine rotors of the HP turbine 132 are rotated by the combustion gases flowing through the core air flow path 140, the turbine rotors of the HP turbine 132 rotate the compressor rotors and, thus, the compressor blades 116 of the HP compressor 114 via the HP shaft 108. Similarly, the turbine rotors of the LP turbine 134 are connected to the LP shaft 109, and the compressor rotors of the LP compressor 112 are connected to the LP shaft 109. When the turbine rotors and, thus, the turbine blades 136 of the LP turbine 134 are rotated by the combustion gases flowing through the core air flow path 140, the turbine rotors of the LP turbine 134 rotate the compressor rotors and, thus, the compressor blades 116 of the LP compressor 112 via the LP shaft 109. The HP shaft 108 and the LP shaft 109 are disposed coaxially about the longitudinal centerline 101. The HP shaft 108 has a larger diameter than the LP shaft 109, and the HP shaft 108 is located radially outward of the LP shaft 109. The HP shaft 108 and the LP shaft 109 are rotatable about the longitudinal centerline 101 and, as discussed above, coupled to rotatable elements such as the compressor rotors and the turbine rotors.

Each of the HP shaft 108 and LP shaft 109 may be supported by a plurality of bearings. For example, the HP shaft 108 is supported by a forward bearing 182 and a rear bearing 184, and the LP shaft 109 is supported by a forward bearing 186 and a rear bearing 188. Although only two bearings are shown in FIG. 2 for each of the HP shaft 108 and LP shaft 109, more than two bearings, e.g., three or four bearings, forward and/or aft of the respective illustrated locations, may be arranged to support the HP shaft 108 or the LP shaft 109 at the respective positions, and may be evenly spaced or irregularly spaced depending on the geometry of the bearing supporting structure, and available space and clearances.

The fan section 102 shown in FIG. 2 includes a fan 150 having a plurality of fan blades 152 coupled to a disk 154. The fan blades 152 and the disk 154 are rotatable, together, about the longitudinal centerline (axis) 101 by the LP shaft 109. The LP compressor 112 may also be directly driven by the LP shaft 109, as depicted in FIG. 2. The disk 154 is covered by a rotatable front hub 156 aerodynamically contoured to promote an airflow through the plurality of fan blades 152. Further, an annular fan casing or an outer nacelle 160 circumferentially surrounds the fan 150 and/or at least a portion of the turbomachine 104. The nacelle 160 is supported relative to the turbomachine 104 by a plurality of circumferentially spaced outlet guide vanes 158. A downstream section 162 of the nacelle 160 extends over an outer portion of the turbomachine 104 so as to define a bypass airflow passage 164 therebetween.

The engine 100 may also include an engine controller 170. The engine controller 170 is configured to operate various aspects of the engine 100, including, in some embodiments, the first temperature regulating system 240 and the second temperature regulating system 250 (see FIGS. 10A and 10B), discussed herein. The engine controller 170 may be a Full Authority Digital Engine Control (FADEC). In this embodiment, the engine controller 170 is a computing device having one or more processors 172 and one or more memories 174. The processor 172 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 174 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 174 can store information accessible by the processor 172, including computer-readable instructions that can be executed by the processor 172. The instructions can be any set of instructions or a sequence of instructions that, when executed by the processor 172, causes the processor 172 and the engine controller 170 to perform operations. In some embodiments, the instructions can be executed by the processor 172 to cause the processor 172 to complete any of the operations and functions for which the engine controller 170 is configured, as will be described further below. The instructions can be software written in any suitable programming language, or can be implemented in hardware. Additionally, and/or alternatively, the instructions can be executed in logically and/or virtually separate threads on the processor 172. The memory 174 can further store data that can be accessed by the processor 172.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The engine 100 shown in FIG. 2 and discussed herein (turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the engine 100 is shown as a direct drive, fixed-pitch turbofan engine, in other embodiments, a gas turbine engine may be a geared gas turbine engine (e.g., including a gearbox between the fan 150 and a shaft driving the fan, such as the LP shaft 109), may be a variable pitch gas turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines, or even have general applicability within other sealing systems for other rotary machines. For example, the embodiments may be applicable to a seal assembly in other machines having rotary components that are variously used in industrial, commercial, and residential applications.

Figure 3:
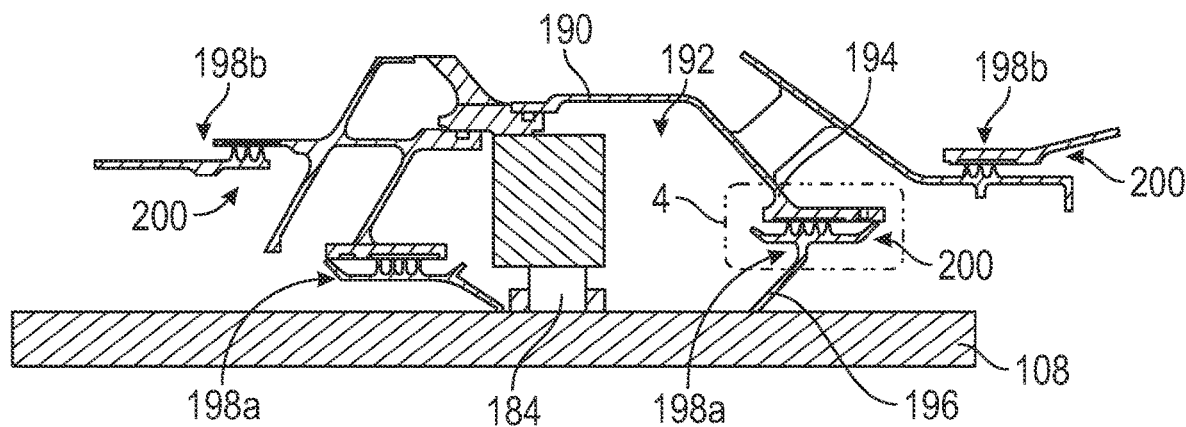
FIG. 3 is a schematic, detail cross-sectional view, showing detail 3 in FIG. 2, of the gas turbine engine shown in FIG. 2.

FIG. 3 is a schematic, detailed, cross-sectional view showing detail 3 in FIG. 2. FIG. 3 shows the rear bearing 184 for the HP shaft 108. The rear bearing 184 is located within a housing 190, forming an oil sump 192 for the rear bearing 184. The housing 190 includes a static portion 194 and a rotating portion 196 that is connected to the HP shaft 108. A rotating seal 198a using a seal assembly 200 according to embodiments discussed herein is formed between the static portion 194 and the rotating portion 196 to provide a seal. In this embodiment, the rotating seal 198a is an oil seal controlling (or preventing) the leakage of oil and air between the oil sump 192 and portions of the turbomachine 104 around the housing 190. In this embodiment, two rotating seals 198a are used in the housing 190, one forward of the rear bearing 184 and one aft of the rear bearing 184. In the following discussion, the seal assembly 200 will be described with reference to the oil seal (rotating seal 198a) for oil sump 192 of the rear bearing 184, but the seal assembly 200 may be used in any other suitable location of the rotary machine (turbomachine 104). As shown in FIG. 3, for example, the seal assembly 200 may be used as an air seal (rotating seals 198b).

Figure 4:
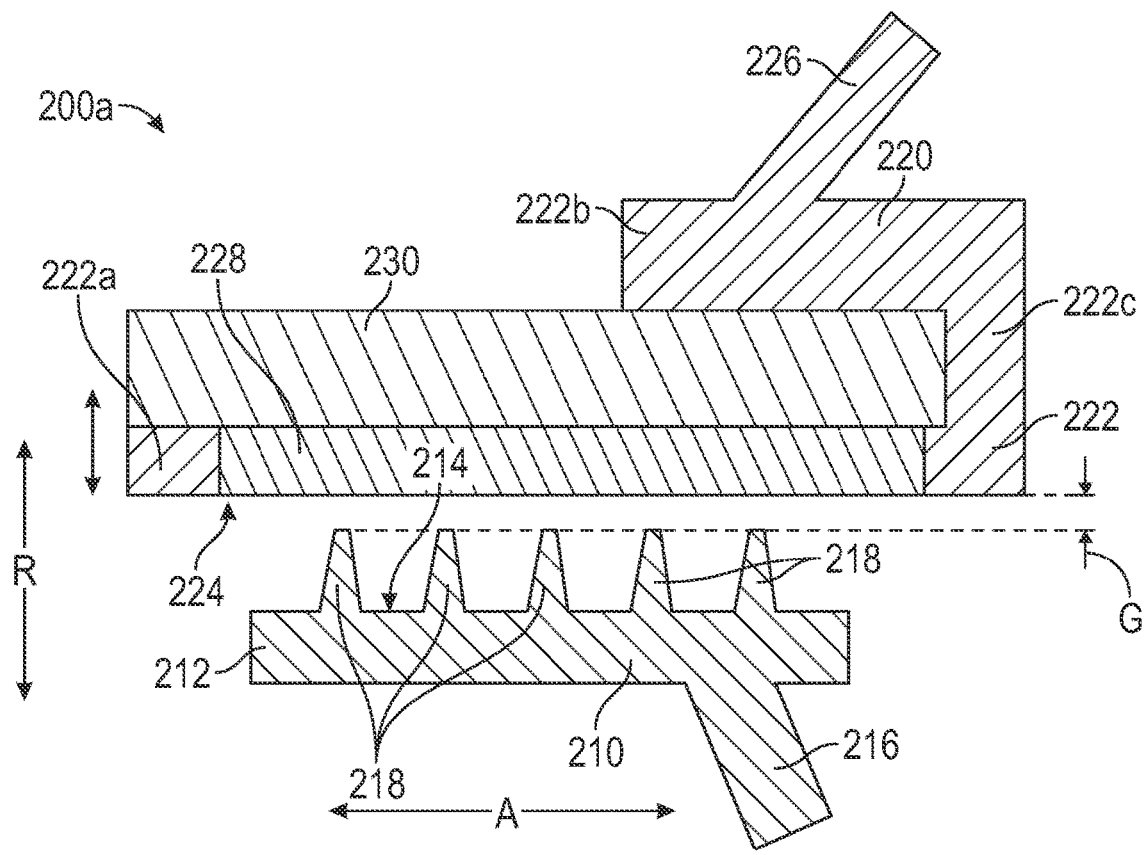
FIG. 4 is a schematic, detail cross-sectional view, showing detail 4 in FIG. 3, of a seal assembly according to a preferred embodiment.

FIG. 4 is a schematic cross-sectional view of a seal assembly 200a according to a first embodiment. As used herein, reference numeral 200 refers generically to the seal assemblies discussed herein, and, when a specific seal assembly is discussed, reference numerals 200a, 200b, 200c, etc., will be used to refer to the seal assembly. For clarity with the other seal assemblies discussed herein, the seal assembly 200a of this embodiment will be referred to as a first seal assembly 200a.

The first seal assembly 200a includes a rotor 210 and a stator 220 that opposes the rotor 210. In this embodiment, the rotor 210 is the rotating portion 196 of the housing 190 and the stator 220 is the static portion 194 of the housing 190 (see FIG. 3). As discussed above, however, the rotor 210 may be any rotating component of the rotary machine (e.g., turbomachine 104), such as the HP shaft 108. Similarly, the stator 220 may be any stationary component of the rotary machine (e.g., turbomachine 104) that opposes the rotor 210.

The rotor 210 of this embodiment includes a rotor seal body 212, having a rotor seal face 214 that faces radially outward relative to the longitudinal centerline 101. In some embodiments, the rotor seal face 214 may be a perimeter of the rotor 210, such as the surface of the HP shaft 108 (see FIG. 3) with the rotor seal body 212 being the HP shaft 108, but, in this embodiment, the rotor seal body 212 is an annular ring that extends circumferentially in the circumferential direction C of the engine 100. The rotor seal body 212 has a thickness in the radial direction R that is less than the length of the rotor seal body 212 in the axial direction A. The rotor seal body 212 is connected to the HP shaft 108 by an arm 216, which also extends circumferentially in the circumferential direction C and forms the rotating portion 196 of the housing 190 (see FIG. 3). The arm 216 extends radially from the HP shaft 108 (see FIG. 3) and may be angled obliquely relative to the longitudinal centerline 101 (axial direction A). Although the arm 216 may attach to the rotor seal body 212 with the rotor seal body 212 being symmetrical in the axial direction A about the attachment point, the rotor seal body 212 is connected to the arm 216 asymmetrically in the axial direction A.

The rotating seal 198a (see FIG. 3) is a labyrinth seal and the rotor 210 also includes a plurality of teeth 218. The teeth 218 are formed on the rotor seal face 214 of the rotor seal body 212 and extend radially from the rotor seal face 214 towards the stator 220. Although shown extending in the radial direction R in FIG. 4 (e.g., being orthogonal to the longitudinal centerline 101), the teeth 218 may have other orientations such as oblique angles relative to the radial direction R in either the forward or aft direction. Each tooth 218 of the plurality of teeth 218 extends circumferentially in the circumferential direction C of the engine 100, and the teeth 218 are parallel to each other. The teeth 218, however, may have any other suitable orientation such as helical orientations.

The stator 220 includes a stator seal body 222, having a stator seal face 224 that faces radially inward relative to the longitudinal centerline 101. As noted above, the stator 220 is opposite the rotor 210 and, more specifically, the rotor seal face 214 and the stator seal face 224 face each other and are positioned to oppose each other. The stator seal body 222 may be any portion of the stator 220. The stator seal body 222 may have a construction similar to that of the rotor seal body 212, where the stator seal body 222 is an annular ring that extends circumferentially in the circumferential direction C of the engine 100. The stator seal body 222 (and more specifically an inner portion 222a of the stator seal body 222) has a thickness in the radial direction R that is less than the length of the stator seal body 222 in the axial direction A. The stator seal body 222 is connected to the stator 220 by an arm 226, that also extends circumferentially in the circumferential direction C and forms the static portion 194 of the housing 190 (see FIG. 3). Although the arm 226 may attach to the stator seal body 222 with the stator seal body 222 being symmetrical in the axial direction A about the attachment point, the stator seal body 222 is connected to the arm 226 asymmetrically in the axial direction A.

The rotor seal body 212, including the teeth 218, are formed from a single material suitable for the environment in which the first seal assembly 200a is used. The rotor seal body 212 and teeth 218 may be formed from a metal, for example. Likewise, the stator seal body 222 may be formed from a material, such as a metal, suitable for the environment in which the first seal assembly 200a is used. For the applications discussed herein, suitable metals for the rotor seal body 212, the teeth 218, and the stator seal body 222 include, for example, steels, such as stainless steels, titanium, titanium alloys, nickel and nickel alloys such as Inconel®, RENE™, and Hastalloy™.

As noted above, the rotor 210 and the stator 220 are positioned relative to each other with a clearance. More specifically, the rotor seal body 212 and the stator seal body 222 oppose each other with a gap G therebetween. Where teeth 218 are used, the gap G is taken as the distance from the tips of the teeth 218 (distal end of the teeth 218 away from the rotor seal face 214) to the stator seal face 224. Under certain conditions, discussed further below, the gap G may narrow such that the teeth 218 contact and wear on the stator seal face 224 as the rotor 210 rotates. The stator seal face 224 of this embodiment includes a layer of abradable material (abradable material layer 228) formed thereon. The abradable material layer 228 may be formed on the surface of the stator seal body 222 or integrated therein, with the abradable material layer 228 facing the teeth 218 of the rotor seal body 212. The abradable material layer 228 is a softer material relative to the teeth 218 such that the abradable material layer 228 wears (abrades) during contact between the teeth 218 and the stator seal face 224. Suitable materials for the abradable material layer 228 include, for example, Teflon®, Metco®, or nickel-graphite coatings. The abradable material layer 228 may have a porous structure, such as a lattice or a honeycomb structure, further softening the abradable material layer 228 relative to the teeth 218. The abradable material layer 228 is thus a sacrificial layer that is designed to wear (abrade) with only minimal wear on the teeth 218.

The first seal assembly 200a includes a shape memory alloy or a bimetallic couple that is used to control the gap G throughout the operating temperature range and the speed range. More specifically, the stator 220 is a multi-layered structure including a temperature sensitive material layer 230. The temperature sensitive material layer 230 may be formed from one of a plurality of materials generally recognized to fall within the class of "shape memory alloys." One suitable shape memory alloy is, for example, a nickel-titanium alloy known under the trade name Nitinol®. Other suitable shape memory alloys include, for example, cobalt-nickel-aluminum alloys, nickel-iron-gallium alloys, iron-manganese-gallium alloys, cobalt-nickel-gallium alloys, nickel-titanium-palladium alloys, nickel-titanium-hafnium alloys, and nickel-manganese-titanium alloys. Alternatively, the temperature sensitive material layer 230 may be used to form a bimetallic couple. The temperature sensitive material layer 230 may be a bimetallic layer comprising two metals having a relatively large difference in coefficients of thermal expansion, or a material that has a relatively large difference in coefficient of thermal expansion with the material used to form the stator seal body 222. For these bimetallic embodiments, the difference in coefficients of thermal expansion is preferably at least fifteen percent (15%) and, more preferably, at least thirty percent (30%). Suitable materials that may be used to form the bimetallic couple include steel and aluminum or Inconel® and titanium, for example.

In the embodiment shown in FIG. 4, the stator seal body 222 has a hairpin or an elongated C-shape, with an inner portion 222a and an outer portion 222b. The inner portion 222a and the outer portion 222b are inner and outer relative to the radial direction R of the engine 100. The inner portion 222a and the outer portion 222b are connected to each other by a connecting portion 222c, and, in the embodiment shown in FIG. 4, the connecting portion 222c is located on one end each of the inner portion 222a and the outer portion 222b. The temperature sensitive material layer 230 is located between the inner portion 222a and the outer portion 222b, and the arm 226 is attached to the outer portion 222b.

As with the stator seal body 222, the temperature sensitive material layer 230 is an annular ring that extends circumferentially in the circumferential direction C of the engine 100. The temperature sensitive material layer 230 also has a thickness in the radial direction R that is less than the length of the temperature sensitive material layer 230 in the axial direction A. The temperature sensitive material layer 230 is bonded to the stator seal body 222 such that the temperature sensitive material layer 230 moves to deform the stator seal body 222 with changes in temperature. More specifically, the temperature sensitive material layer 230 and, thus, the shape memory alloy or bimetallic couple, is positioned within the stator seal body 222 to move the stator seal face 224 towards or away from the rotor seal face 214.

Shape memory alloys may undergo a phase change with changing (an increase or decrease) in temperature. Nitinol®, for example, may change between an austenitic phase and a martensitic phase. The temperature (or temperature range) at which this phase change occurs may be referred to as a transformation temperature. The shape memory alloy used to form the temperature sensitive material layer 230 has a transformation temperature range appropriate for the thermal operating range of the first seal assembly 200a, and the first seal assembly 200a is configured to be exposed to thermal cycling passing through the transformation temperature range of the selected shape memory alloy. Many of the shape memory alloys discussed above, like Nitinol®, can be tuned to have a transformation temperature in the range from room temperature (e.g., seventy degrees Fahrenheit (70° F.) (twenty-one degrees Celsius (21 ° C.))) to two hundred twelve degrees Fahrenheit (212° F.) (one hundred degrees Celsius (100° C.)). As first seal assembly 200a increases in temperature during start up or decreases in temperature during cool down, for example, the temperature sensitive material layer 230 will pass through the transition temperature, and the shape memory alloy undergoes a phase change. With this phase change, the temperature sensitive material layer 230 will increase movement of the stator seal body 222 or constrain the movement of the stator seal body 222 relative to the rotor seal body 212, such that the gap G undergoes only small changes in size. As will be discussed in more detail below, the temperature sensitive material layer 230 controls the seal clearance (gap) throughout the operational range. The first seal assembly 200a is one example and other examples follow.

Figure 5:
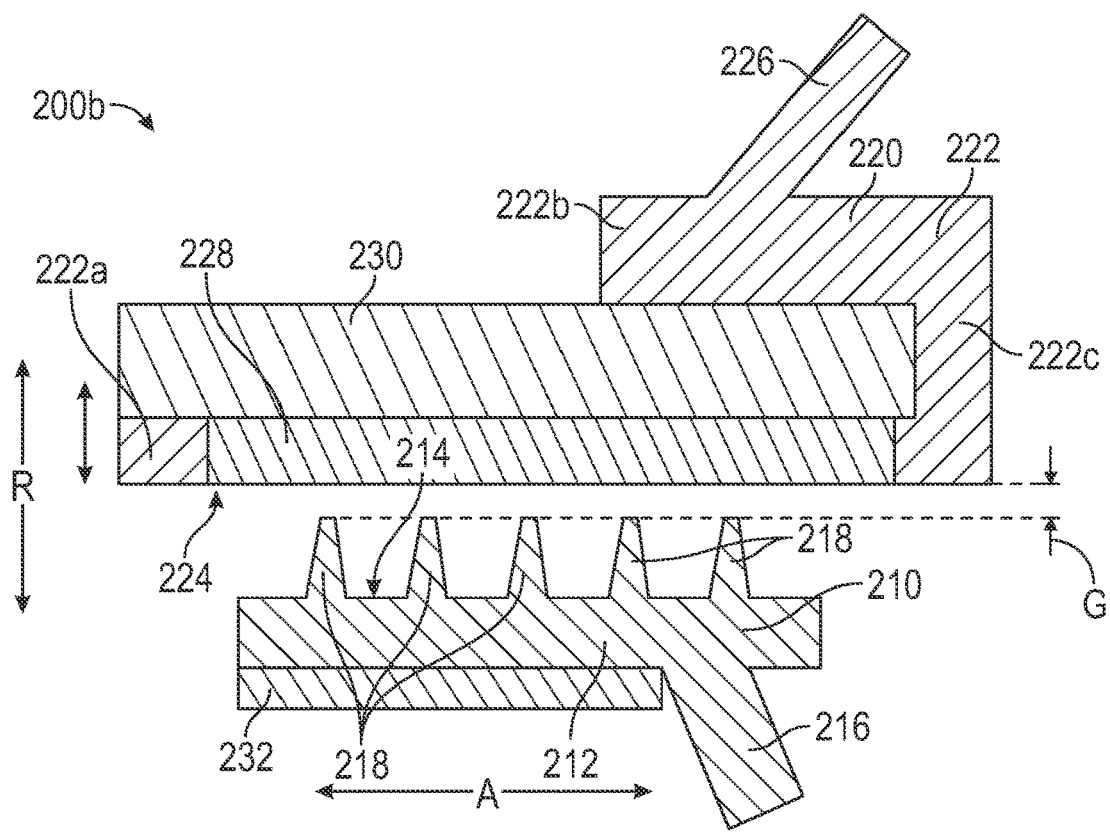
FIG. 5 is a schematic cross-sectional view of a seal assembly according to another embodiment.

FIG. 5 is a schematic cross-sectional view of a seal assembly 200b according to another embodiment. For clarity with the other seal assemblies discussed herein, the seal assembly 200b of this embodiment will be referred to as a second seal assembly 200b. The second seal assembly 200b of this embodiment is similar to the first seal assembly 200a discussed above with reference to FIG. 4. The same reference numerals will be used for components of the second seal assembly 200b of this embodiment that are the same or similar to the components of the first seal assembly 200a discussed above with reference to FIG. 4. The description of these components above also applies to this embodiment, and a detailed description of these components is omitted here.

In the first seal assembly 200a, the stator seal body 222 included the temperature sensitive material layer 230. However, the rotor seal body 212 also includes a temperature sensitive material layer 232 that is bonded to the rotor seal body 212. The temperature sensitive material layer 232 is preferably bonded to an interior surface of the rotor seal body 212 to avoid interfering with the teeth 218. The description of the temperature sensitive material layer 230 above also applies to the temperature sensitive material layer 232, and the combination of the temperature sensitive material layer 230 and the temperature sensitive material layer 230 are used to control the relative movement of the rotor seal body 212 and the stator seal body 222.

Figure 6:
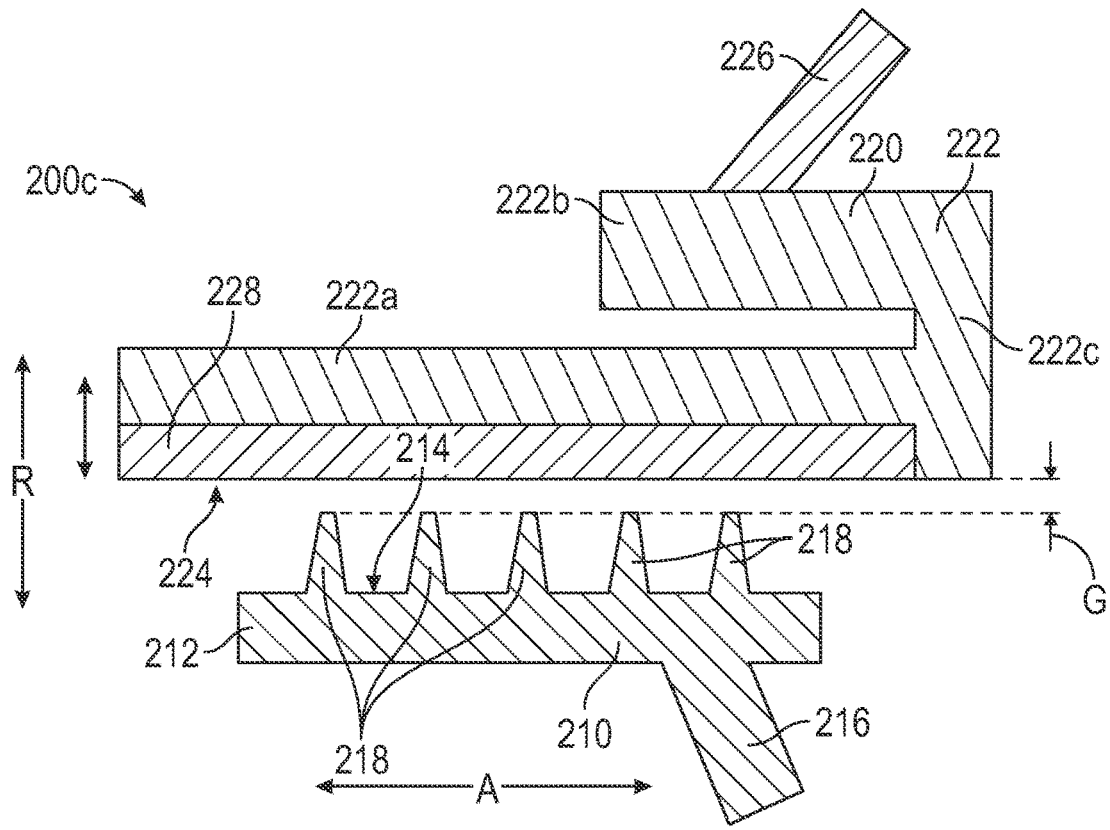
FIG. 6 is a schematic cross-sectional view of a seal assembly according to another embodiment.

FIG. 6 is a schematic cross-sectional view of a seal assembly 200c according to another embodiment. For clarity with the other seal assemblies discussed herein, the seal assembly 200c of this embodiment will be referred to as a third seal assembly 200c. The third seal assembly 200c of this embodiment is similar to the seal assemblies discussed above, and the same reference numerals will be used for components of the third seal assembly 200c of this embodiment that are the same or similar to the components of the seal assemblies discussed above. The description of these components above also applies to this embodiment, and a detailed description of these components is omitted here. Instead of using a temperature sensitive material layer 230, the stator seal body 222 itself is formed from a shape memory alloy (SMA) or bimetallic materials. The discussion of such materials in the temperature sensitive material layer 230 above, also applies to their implementation here.

Figure 7:
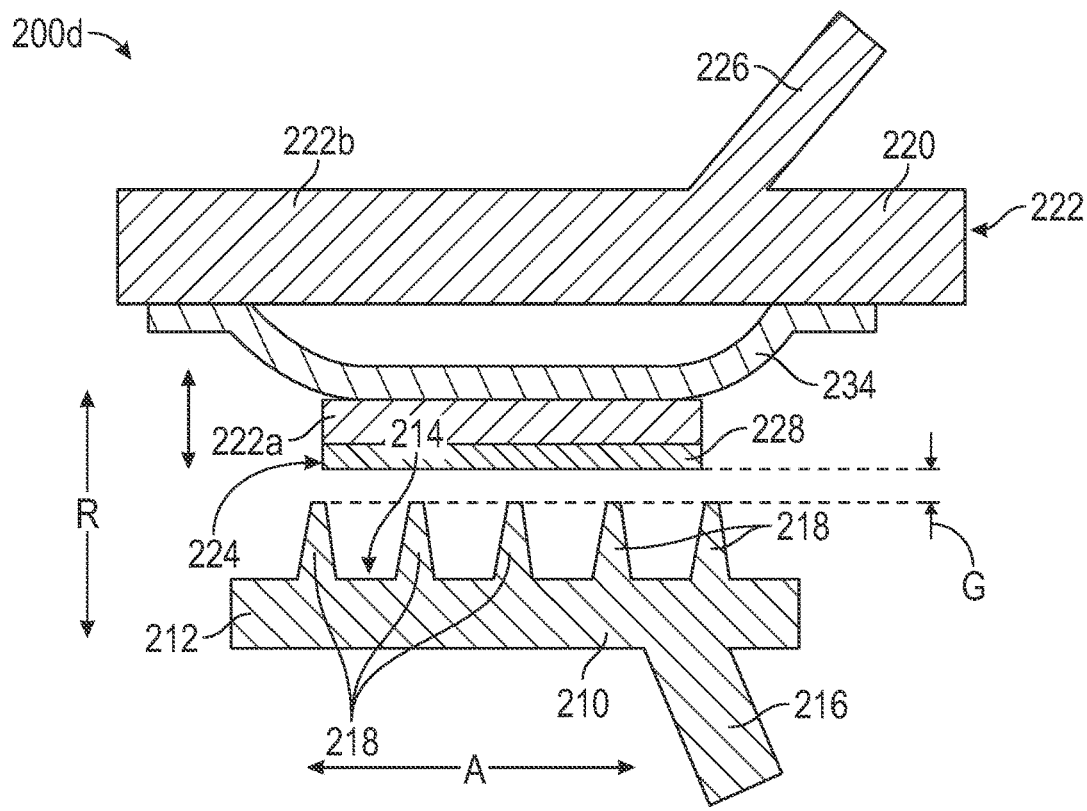
FIG. 7 is a schematic cross-sectional view of a seal assembly according to another embodiment.

FIG. 7 is a schematic cross-sectional view of a seal assembly 200d according to another embodiment. For clarity with the other seal assemblies discussed herein, the seal assembly 200d of this embodiment will be referred to as a fourth seal assembly 200d. The fourth seal assembly 200d of this embodiment is similar to the seal assemblies discussed above, and the same reference numerals will be used for components of the fourth seal assembly 200d of this embodiment that are the same or similar to the components of the seal assemblies discussed above. The description of these components above also applies to this embodiment, and a detailed description of these components is omitted here.

Instead of the stator seal body 222 having a C-shape, the inner portion 222a and the outer portion 222b are not integrally connected to each other. Instead one or more springs (a leaf spring 234 having a U-shape) is used to connect the inner portion 222a and the outer portion 222b. The leaf spring 234 is bonded to each of the inner portion 222a and the outer portion 222b. The leaf spring 234 is formed of the materials discussed above for the temperature sensitive material layer 230 and moves based on the operating condition changes (e.g., temperature) as discussed above. With movement of the leaf spring 234, the inner portion 222a moves radially inward and outward relative to the outer portion 222b and thereby controls the gap G, in the manner discussed above.

Figure 8:
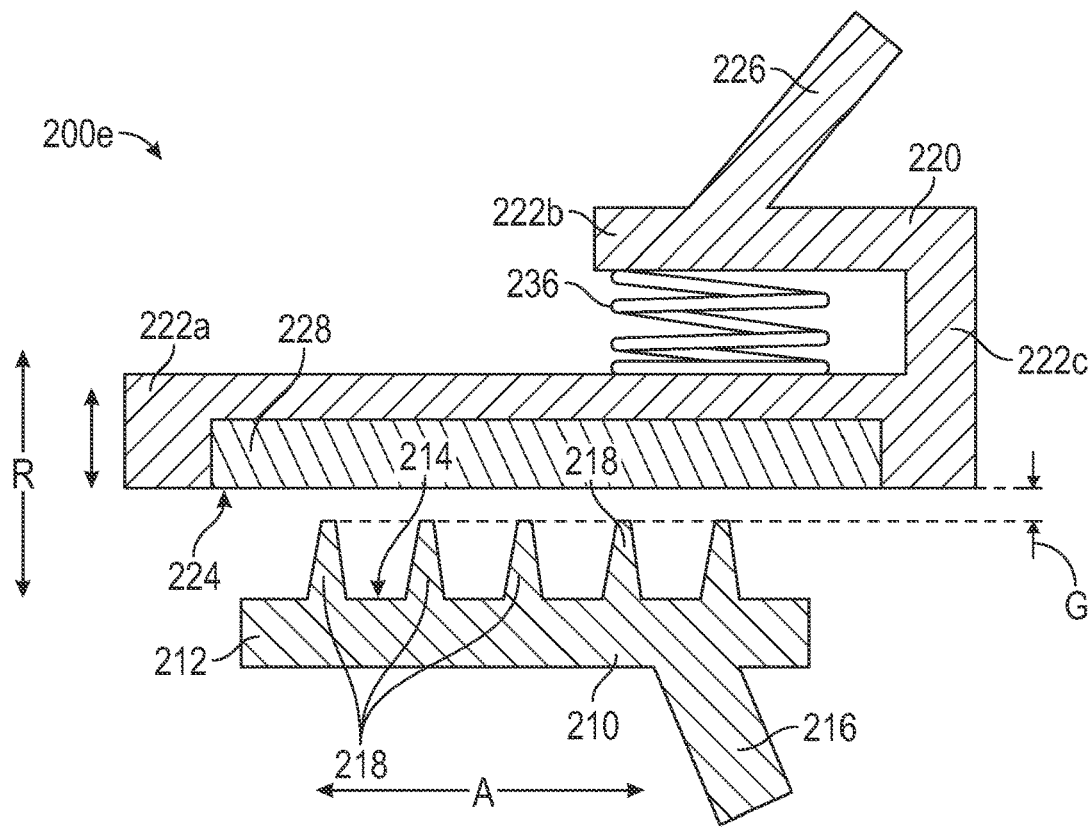
FIG. 8 is a schematic cross-sectional view of a seal assembly according to another embodiment.

FIG. 8 is a schematic cross-sectional view of a seal assembly 200e according to another embodiment. For clarity with the other seal assemblies discussed herein, the seal assembly 200e of this embodiment will be referred to as a fifth seal assembly 200e. The fifth seal assembly 200e of this embodiment is similar to the seal assemblies discussed above, and the same reference numerals will be used for components of the fifth seal assembly 200e of this embodiment that are the same as or similar to the components of the seal assemblies discussed above. The description of these components above also applies to this embodiment, and a detailed description of these components is omitted here.

In the fourth seal assembly 200d shown in FIG. 7, the inner portion 222a and the outer portion 222b were disconnected and moved relative to each other by one or more springs (leaf spring 234). A spring (circumferential spring 236) is also used, but, instead of the inner portion 222a and the outer portion 222b being disconnected (as in the fourth seal assembly 200d shown in FIG. 7), the stator seal body 222 is C-shaped, as in the first seal assembly 200a shown in FIG. 4, and the inner portion 222a is connected to the outer portion 222b by the connecting portion 222c. The circumferential spring 236 extends in the circumferential direction C between the inner portion 222a and the outer portion 222b. Suitable circumferential springs 236 that may be used in this arrangement of the stator seal body 222 include, for example, wave springs, bellows springs, and foil springs. The circumferential spring 236 is made from the same materials as the leaf spring 234 and, thus, moves based on the operating condition changes (e.g., temperature) as discussed above.

Figure 9:
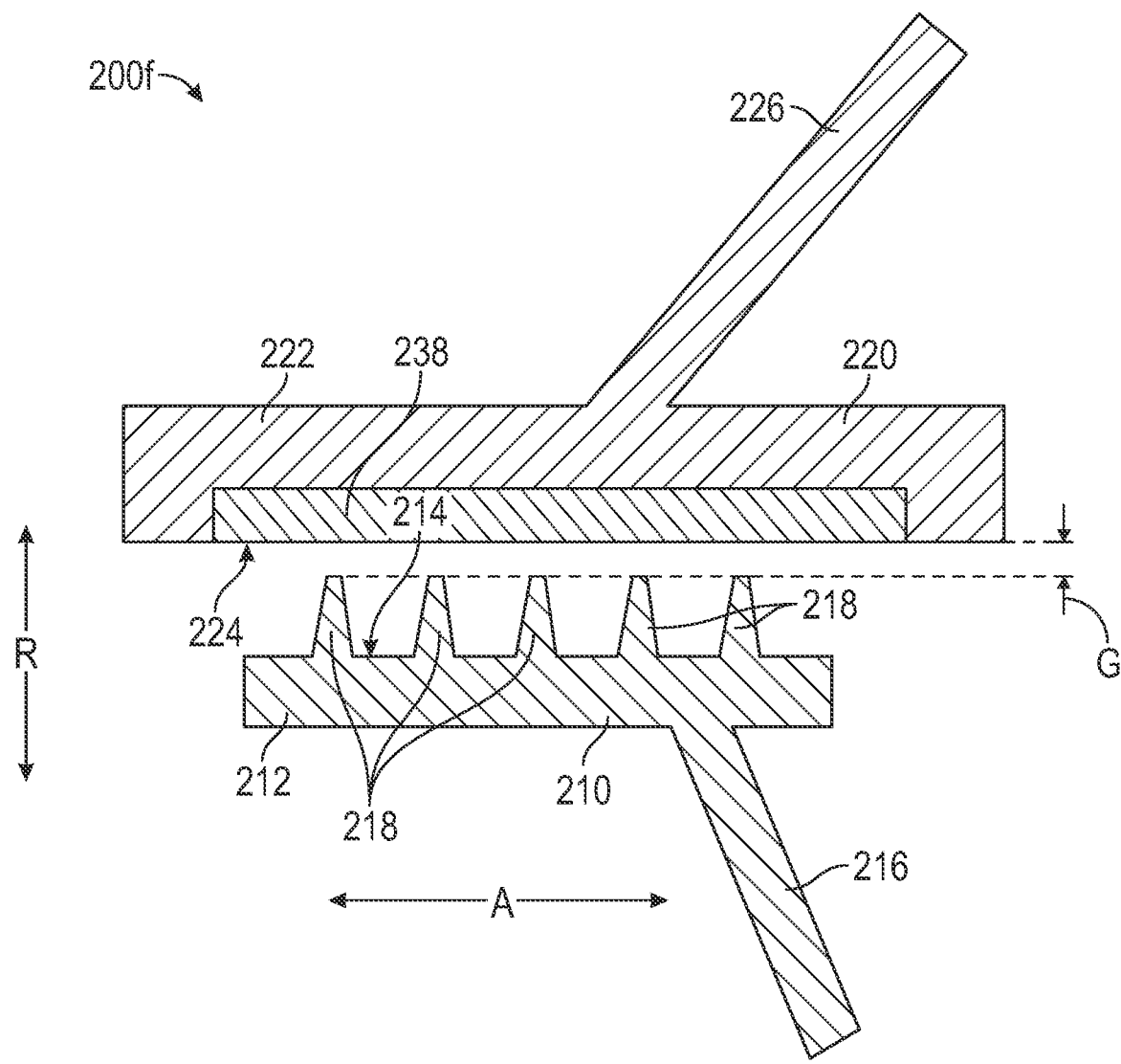
FIG. 9 is a schematic cross-sectional view of a seal assembly according to another embodiment.

FIG. 9 is a schematic cross-sectional view of a seal assembly 200f according to another embodiment. For clarity with the other seal assemblies discussed herein, the seal assembly 200f of this embodiment will be referred to as a sixth seal assembly 200f. The sixth seal assembly 200f of this embodiment is similar to the seal assemblies discussed above, and the same reference numerals will be used for components of the sixth seal assembly 200f of this embodiment that are the same as or similar to the components of the seal assemblies discussed above. The description of these components above also applies to this embodiment, and a detailed description of these components is omitted here.

As in the previous embodiments, the stator seal body 222 of this embodiment includes an abradable material layer 238, but the abradable material layer 238 is formed of the materials discussed above for the temperature sensitive material layer 230. Accordingly, the abradable material layer 238 moves based on the operating condition changes (e.g., temperature) as discussed above. The abradable material layer 238 of this embodiment may have a porous, honeycomb, or other lattice structure to promote the preferential wear of the abradable material layer 238 instead of the teeth 218. The abradable material layer 238 may be formed by additive manufacturing techniques to form the lattice structure.

Figure 10A:
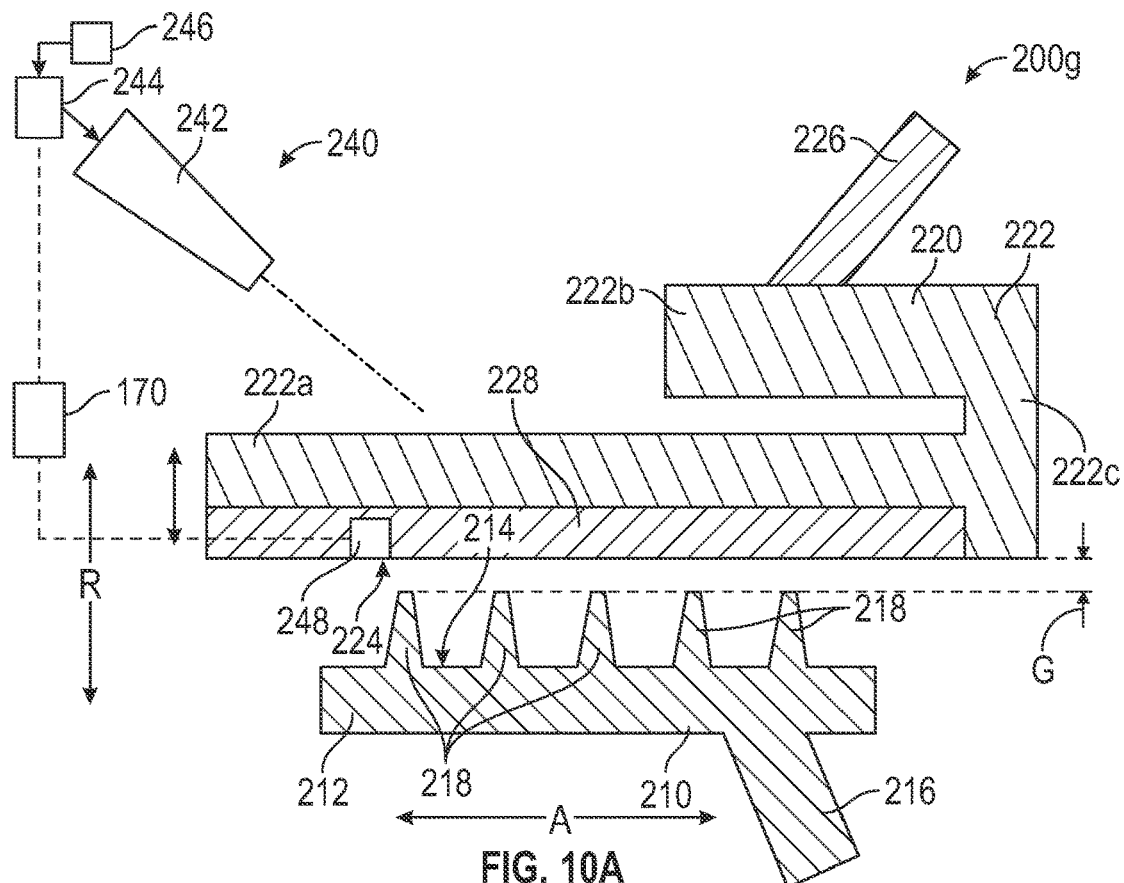
FIGS. 10A and 10B are schematic cross-sectional views of a seal assembly according to other embodiments having a temperature regulating system.
Figure 10B:
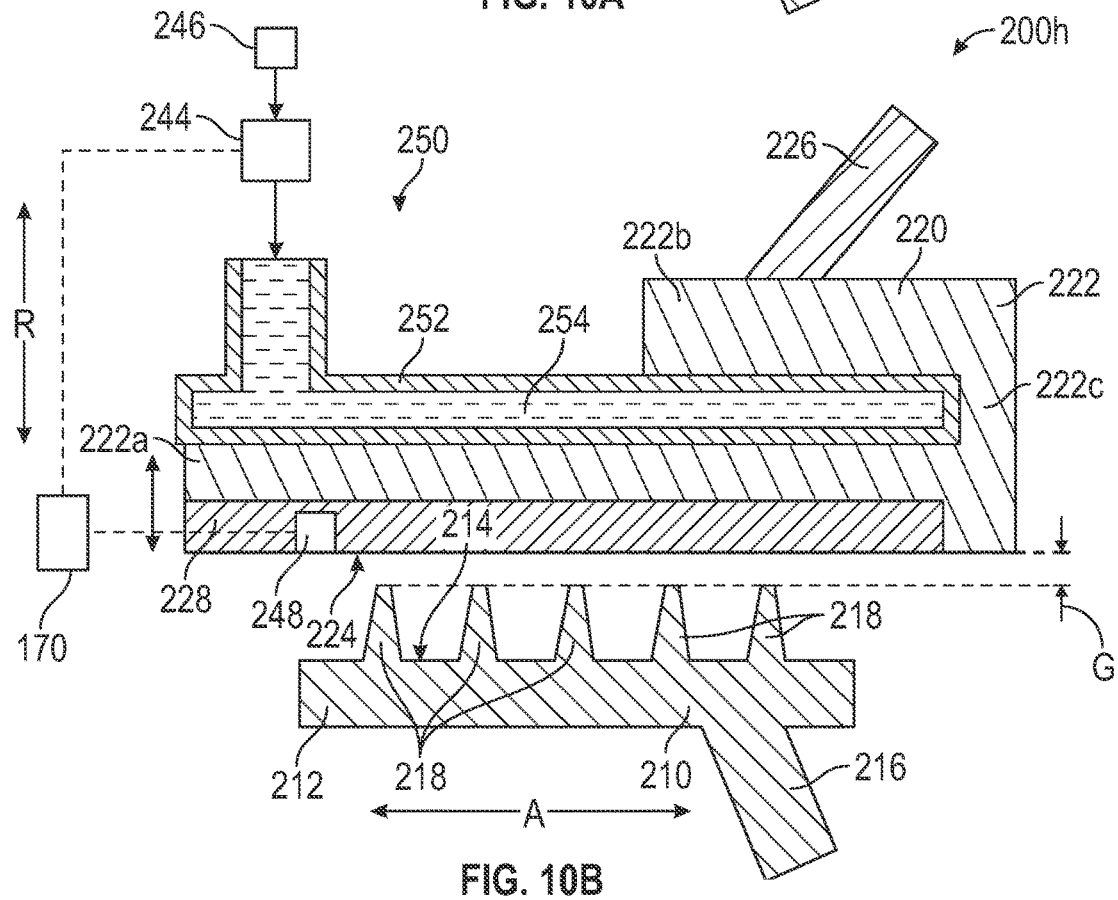

FIGS. 10A and 10B are schematic cross-sectional views of seal assemblies 200g, 200h according to other embodiments each having a temperature regulating system 240, 250. For clarity with the other seal assemblies discussed herein, the seal assembly 200g shown in FIG. 10A will be referred to as a seventh seal assembly 200g, and the seal assembly 200h shown in FIG. 10B will be referred to as an eighth seal assembly 200h. The seventh seal assembly 200g and the eighth seal assembly 200h are similar to the third seal assembly 200c discussed above with reference to FIG. 6, and the same reference numerals will be used for components of the seventh seal assembly 200g and the eighth seal assembly 200h that are the same as or similar to the components of the third seal assembly 200c discussed above with reference to FIG. 6. The description of these components above also applies to this embodiment, and a detailed description of these components is omitted here. Although described using the stator seal body 222 of the third seal assembly 200c, the temperature regulating systems 240, 250 may be used to regulate the temperature of the shape memory alloy or the bimetallic materials in any of the embodiments discussed herein.

In the embodiment discussed above, the shape memory alloy or the bimetallic materials were tuned to control the gap G based on the operating conditions to which the seal assembly 200 is exposed. Instead of, or in addition to, relying on operational conditions to drive the temperature of the stator seal body 222 the temperature of the stator seal body 222, and, thus, the shape memory alloy or the bimetallic couple may be actively controlled. The temperature of the stator seal body 222 may be actively controlled by a suitable controller, such as the engine controller 170. The engine controller 170 is communicatively and operatively coupled to a suitable temperature regulating system 240, 250. The temperature regulating system 240, 250 may be any suitable system. For example, FIG. 10A shows a first temperature regulating system 240, and FIG. 10B shows a second temperature regulating system 250. The first temperature regulating system 240 and the second temperature regulating system 250 are each configured to regulate the temperature of the stator seal body 222 and, more specifically, the temperature sensitive material.

The first temperature regulating system 240 shown in FIG. 10A includes a plurality of nozzles 242 arrayed in the circumferential direction C and positioned to spray (direct) fluid onto the stator seal body 222. The temperature of the fluid thus regulates the temperature of the stator seal body 222. In the example discussed herein where the seal assembly 200 is used for an oil sump (oil sump 192), the fluid is preferably oil, but other fluids may be used.

The second temperature regulating system 250 shown in FIG. 10B also uses a fluid, such as oil, to regulate the temperature of the stator seal body 222. The second temperature regulating system 250 of this embodiment includes a jacket 252 defining a channel 254 therein. The jacket 252 is in thermal contact with the stator seal body 222, and as the fluid flows in and through the channel 254, the fluid regulates the temperature of the stator seal body 222.

In the embodiments shown in FIGS. 10A and 10B, the engine controller 170 is operatively coupled to a flow control device 244 to control the flow of the fluid through the nozzles 242 or the jacket 252. Suitable flow control devices 244 include, for example, a valve or a pump. The nozzles 242 are or the jacket 252 is fluidly coupled to a fluid source 246 (such as an oil reservoir). Adjusting or otherwise operating the flow control device 244, such as the position (amount open or closed) of a valve or the speed of a pump, adjusts the flow of the fluid through the nozzles 242 or the channel 254 and can be used to change the temperatures of the stator seal body 222.

The engine controller 170 may use various suitable inputs to control the temperature. The first temperature regulating system 240 and the second temperature regulating system 250 may include, for example, a gap sensor 248 configured to determine the distance between the stator seal face 224 and the rotor seal face 214 and, thus, the size of the gap G. Any suitable gap sensor 248 may be used including, for example, a laser sensor, an ultrasonic sensor, or other non-contact sensor. The engine controller 170 is communicatively coupled to the gap sensor 248 to receive gap information from the gap sensor 248. The engine controller 170 is configured to adjust the temperature of the stator seal body 222 based on the gap information received from the gap sensor 248 by operating the temperature regulating system, 240, 250, as discussed above. The gap sensor 248 is shown as being located within the stator seal body 222, but the gap sensor 248 may be located at any suitable location to measure the distance between the stator seal face 224 and the rotor seal face 214.

Figure 11:
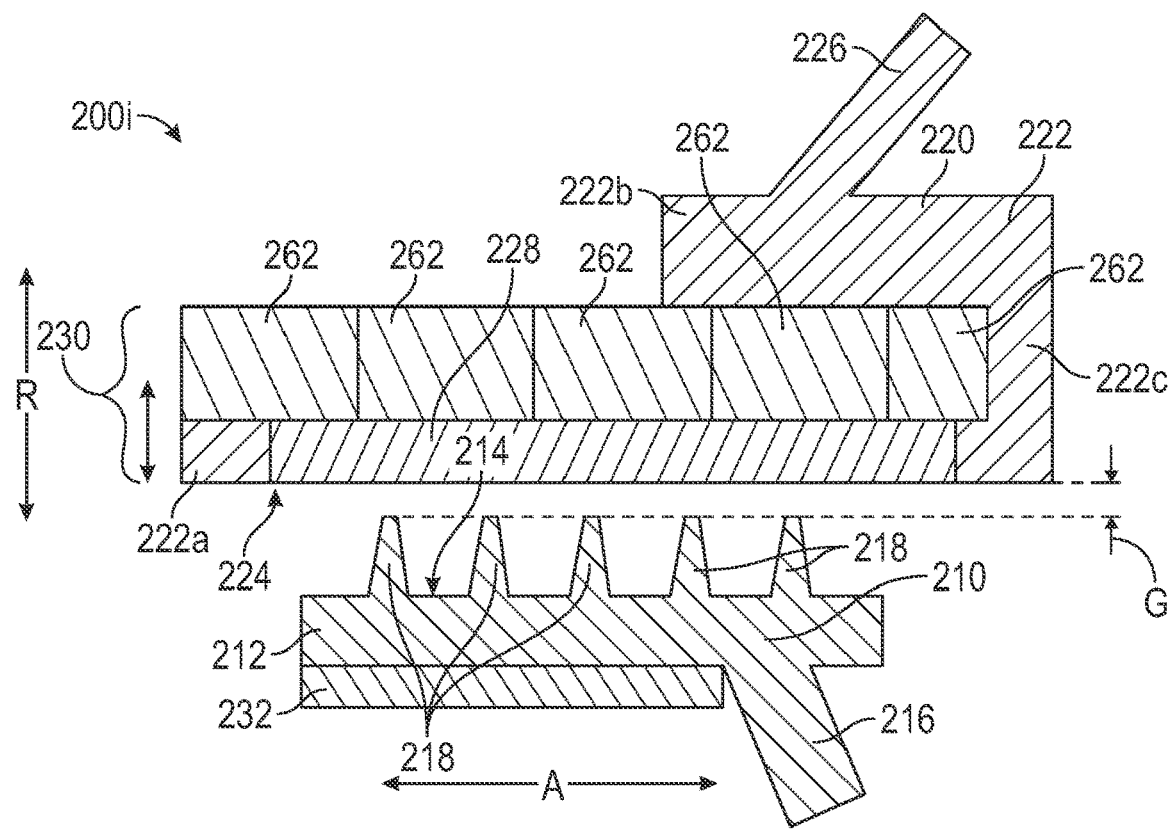
FIG. 11 is a schematic cross-sectional view of a seal assembly according to another embodiment.

FIG. 11 is a schematic cross-sectional view of a seal assembly 200i according to another embodiment. For clarity with the other seal assemblies discussed herein, the seal assembly 200i of this embodiment will be referred to as a ninth seal assembly 200i. The ninth seal assembly 200i of this embodiment is similar to the seal assemblies discussed above, and the same reference numerals will be used for components of the ninth seal assembly 200i of this embodiment that are the same as or similar to the components of the seal assemblies discussed above. The description of these components above also applies to this embodiment, and a detailed description of these components is omitted here.

In the first seal assembly 200a and the second seal assembly 200b, the temperature sensitive material layer 230 may have constant properties over the entire axial length of the temperature sensitive material layer 230. For example, when a shape memory alloy (SMA) is used for the temperature sensitive material layer 230, the temperature sensitive material layer 230 may have the same transition temperature over the entire axial length of the temperature sensitive material layer 230. The stator seal body 222 may, however, change shape in a non-uniform manner over the axial length of the stator seal body 222 because of, for example, localized differences in the operating conditions and/or differences in constraint (e.g., location of the arm 226). The temperature sensitive material layer 230 of the ninth seal assembly 200i includes a plurality of segments (axial segments 262) in the axial direction A. The axial segments 262 have different properties relative to other axial segments 262, such as adjacent axial segments 262. The axial segments 262 can impart a different dimensional change on the stator seal body 222 and thereby account for differential operating conditions and/or differences in constraint and provide a more uniform gap G over the axial length of the stator seal face 224. The different properties may include, for example, different transition temperatures for shape memory alloys or different coefficients of thermal expansion.

Figure 12:
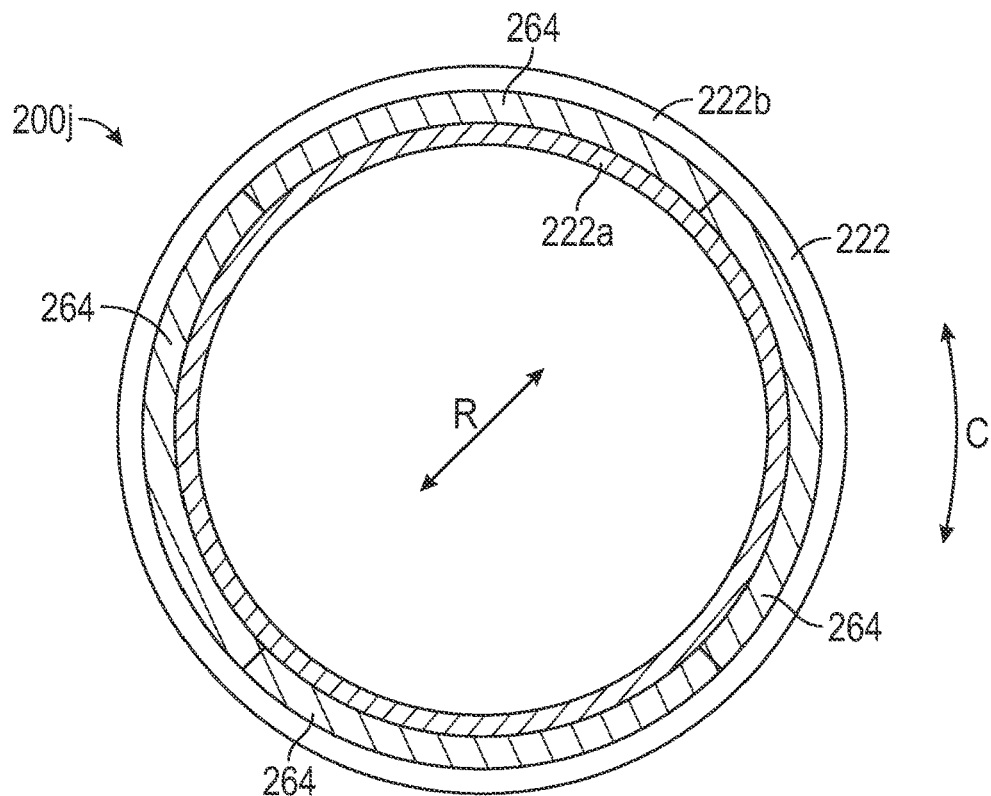
FIG. 12 is an axial cross-sectional view of a seal assembly according to another embodiment.

FIG. 12 is an axial cross-sectional view of a seal assembly according to another embodiment. For clarity with the other seal assemblies discussed herein, the seal assembly 200j of this embodiment will be referred to as a tenth seal assembly 200j. The tenth seal assembly 200j of this embodiment is similar to the seal assemblies discussed above, and the same reference numerals will be used for components of the tenth seal assembly 200j of this embodiment that are the same as or similar to the components of the seal assemblies discussed above. The description of these components above also applies to this embodiment, and a detailed description of these components is omitted here.

Differences in operating conditions and constraint on the stator seal body 222 may also occur in the circumferential direction C. Such differences may result in the stator seal body 222 and/or the rotor seal body 212 having an out of round condition and, thus, there is a differential gap G in the circumferential direction C. The temperature sensitive material layer 230 of the tenth seal assembly 200j includes a plurality of segments in the circumferential direction (radial segments 264). Similar to the axial segments 262, these radial segments 264 may have different properties relative to other radial segments 264, such as adjacent radial segments 264 to impart a different dimensional change on the stator seal body 222. The different properties may include, for example, different transition temperatures for shape memory alloys or different coefficients of thermal expansion. For example, axial segments of the plurality of axial segments may have different coefficients of thermal expansion at operation (discussed further below) from each other.

In many of the embodiments discussed above, the shape memory alloy or the bimetallic materials are part of the stator 220 and, more specifically, the stator seal body 222. However, the shape memory alloy or the bimetallic materials may also be implemented as part of the rotor 210 and, more specifically, the rotor seal body 212 in a manner similar to the implementation in the stator seal body 222. Accordingly, the seal assembly 200 discussed herein may include a stator seal body 222 and a rotor seal body 212, and at least a portion of one of the stator seal body 222 and the rotor seal body 212 is formed from a shape memory alloy or bimetallic materials.

Different variations of the seal assembly 200 with at least a portion of one of the stator seal body 222 and the rotor seal body 212 formed from a shape memory alloy or bi-metals are possible, provided the resultant seal assembly 200 satisfies certain criteria described below. As discussed with reference to FIGS. 4 to 12, the seal assembly 200 and, more specifically, the stator seal body 222 or the rotor seal body 212 may incorporate shape memory alloy or bimetals in different positions and locations. Different shape memory alloys or different combinations of metals also can be used. Selecting the right combination of these features for a particular application is necessary to maintain the correct amount of movement and growth over the entire operating temperate range. Otherwise, the seal assembly 200 may have a clearance (gap G) that behaves closer to the comparison example with wide "as assembled" (ambient temperature) gaps G and rubbing at elevated temperatures.

Figure 13A:
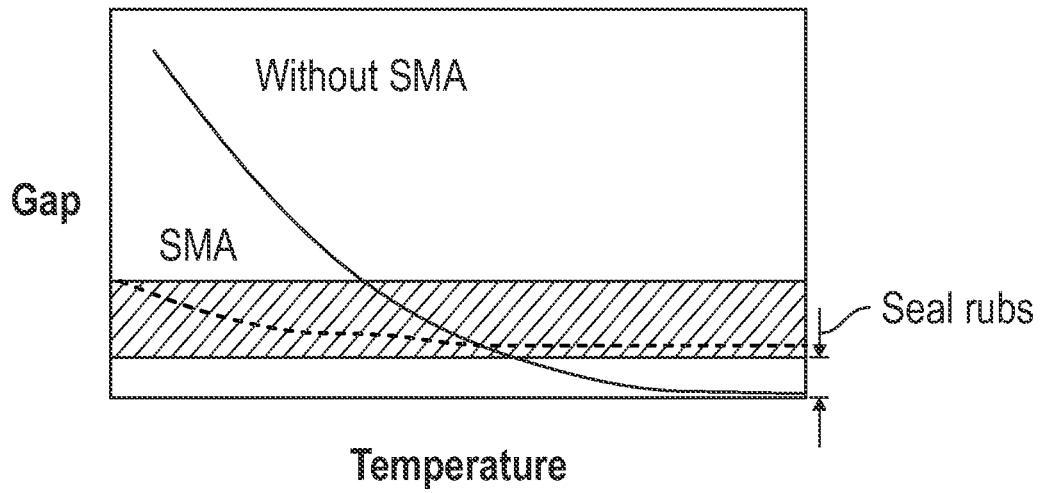
FIGS. 13A and 13B are graphs illustrating the behavior of a gap in the seal assembly as a function of temperature (FIG. 13A) or rotor speed (FIG. 13B) using seal assemblies.

FIG. 13A is a graph illustrating the behavior of the gap G as a function of temperature. The solid line labeled "Without SMA" is a comparison example without the temperature sensitive material layer 230 incorporated into the seal assembly 200, and the broken line labeled "SMA" is the first seal assembly 200a discussed above with the temperature sensitive material layer 230. The gap G may be the largest at low temperatures (such as ambient temperatures or room temperature corresponding to assembly of, for example, seventy degrees Fahrenheit (70° F.) (twenty-one degrees Celsius (21° C.)). As the temperature increases, the gap G decreases. In the comparative example without the temperature sensitive material layer 230, the change in the gap G size can be significant and, depending upon how the initial or the assembly clearance is set (ambient temperature clearance), may result in rubbing at high operating temperatures. In contrast, the stator seal body 222 with the temperature sensitive material layer 230 does not exhibit such a large difference in the clearance (gap G). The temperature sensitive material layer 230 can be used such that the phase change deflects the stator seal body 222 towards the rotor seal body 212 at low temperatures, such as the ambient temperatures discussed herein and/or inhibits growth of the stator seal body 222 at high temperatures, such as the operating temperatures discussed herein, thereby minimizing the change in the gap G throughout the entire operating range. When the bimetallic couple is used, the bimetallic couple can be tuned to have the same effect over the operating temperature range. The movement of the temperature sensitive material layer 230 may be driven by the coefficient of thermal expansion and, more specifically, the linear coefficient of thermal expansion (a), of the shape memory alloy or the bimetallic couple. As noted above, shape memory alloys undergo a phase change and may thus have different coefficients of thermal expansion in each phase. Such coefficients of thermal expansion can also be tuned by metallurgical processes such that the same material can have different coefficients of thermal expansion depending upon how the material is formed or otherwise treated.

Figure 13B:
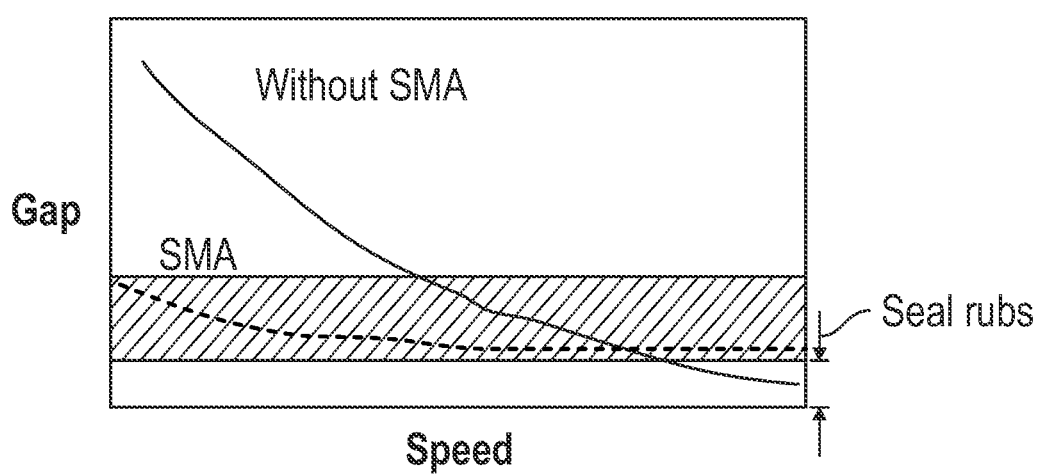

FIG. 13B is a graph illustrating the behavior of the gap G as a function of rotational speed of the rotor 210. As with the graph of FIG. 13A, the solid line labeled "Without SMA" is a comparison example without the temperature sensitive material layer 230 incorporated into the seal assembly 200 and the broken line labeled "SMA" is the first seal assembly 200a of this embodiment with the temperature sensitive material layer 230. The gap G may be the largest when the rotor 210 is not rotating (stationary). As the rotor 210 begins to rotate and the speed increases, the gap G decreases. In the comparative example without the temperature sensitive material layer 230, the change in the gap G size can be significant and, depending upon how the initial or assembly clearance is set (stationary clearance), may result in rubbing at high operating speeds. The temperature sensitive material layer 230 can be used to not only account for the temperature effects on the change in the gap G size, but also any other effects on the change in the gap G size from assembly to operational condition, such as the speed effects.

In this way, the temperature sensitive material layer 230 controls the seal clearance (gap) throughout the operational range. The change in the gap G can thus be more constant, and, thus, the leakage rate is more constant, avoiding the issues discussed above. The shape memory alloy (SMA) or the bimetallic couple can be incorporated into the seal assembly 200 a number of different ways, as discussed above, for example.

During the course of evaluating the variations possible in the design, including the effectiveness and the reliability or efficiency in maintaining an appropriate and a more constant clearance (gap G) over the entire operating temperate range, the inventors, discovered, unexpectedly, that there exists a relationship among select features of the seal assembly 200 that produced superior results over the other numerous other designs considered. The inventors refer to this relationship as the seal clearance compliance ratio (SCCR). SCCR is a dimensionless factor given in terms of percent defined according to the following relationship (1):

$$\text{Seal Clearance Compliance Ratio } (SCCR) = \left(1 - \left(\frac{G_a}{G_o} \times R_\alpha\right)\right) \times 100\% \quad (1)$$

The SCCR is a relationship of the seal clearance gap ratio at assembly ($G_a$), the seal clearance gap ratio at operation ($G_o$), and the ratio of thermal expansion ($R_\alpha$), as described in further detail below.

The seal clearance gap ratio at assembly ($G_a$) is the ratio of the inner diameter of the stator 220 to the outer dimeter of the rotor 210. In the seal clearance gap ratio at assembly ($G_a$), these dimensions are determined in an as-assembled condition. The as-assembled condition is when the rotary machine (turbomachine 104) is not operating. In such a condition, the rotor 210 is stationary and the temperature is an ambient temperature taken at seventy degrees Fahrenheit (70° F.) (twenty-one degrees Celsius (21 ° C.)).

The seal clearance gap ratio at operation ($G_o$) is also the ratio of the inner diameter of the stator 220 to the outer dimeter of the rotor 210. In the seal clearance gap ratio at operation ($G_o$), however, these dimensions are determined in a standard operating condition. Rotary machines in which the seal assembly 200 have a primary operating condition. That is, the primary operating condition is a condition at which the seal assembly 200 operates a majority of the time. This is the condition used for the standard operating condition. In the embodiments discussed herein where the seal assembly 200 is used in a gas turbine engine (engine 100) for an aircraft 10, the standard operating condition is taken as the operating condition at cruise. The standard operating condition will have a rotor 210 and an operating temperature.

The outer diameter of the rotor 210 is, more specifically, the outer dimeter of the rotor seal body 212. The outer dimeter of the rotor seal body 212 is taken at the tips of the teeth 218, and when there is axial variation in the diameter of the teeth 218, the outer diameter is the average diameter taken from the diameters of each tooth 218. Similarly, to the extent the diameter varies in the circumferential direction C (e.g., an out of round condition) the outer diameter is an average outer diameter.

The inner diameter of the stator 220 is, more specifically, the inner dimeter of the stator seal body 222. The inner diameter of the stator seal body 222 is the stator seal face 224 and, in the embodiments discussed above, when the stator seal body 222 includes the abradable material layer 228, the inner diameter of the stator seal body 222 is the inner diameter of the abradable material layer 228. As with the outer diameter of the rotor 210, an average diameter is used to the extent the inner diameter stator seal body 222 varies in the axial direction or the circumferential direction C.

The ratio of thermal expansion ($R_\alpha$) is the ratio of coefficients of thermal expansion and, more specifically, the linear coefficients of thermal expansion ($\alpha$) for the component of the seal assembly 200 that includes the temperature sensitive material. More specifically, the ratio of thermal expansion ($R_\alpha$) is the ratio of the linear coefficient of thermal expansion at operation ($\alpha_o$) to the linear coefficient of thermal expansion at assembly ($\alpha_a$), as shown in the following relationship (2):

$$R_\alpha = \frac{\alpha_o}{\alpha_a} \quad (2)$$

The operation condition and assembly condition are determined as discussed above. In the embodiments discussed above, the stator 220 includes the temperature sensitive material, and, in these embodiments, the ratio of thermal expansion ($R_\alpha$) is determined for the stator 220. Accordingly, this ratio may also be referred to as the stator growth ratio. In embodiments where the rotor 210 includes the temperature sensitive material and not the stator 220, the ratio of thermal expansion ($R_\alpha$) is determined for the rotor 210 and may be referred to as the rotor growth ratio.

The temperature sensitive material, particularly, the shape memory alloy, has a relatively large difference in the linear coefficient of thermal expansion at operation ($\alpha_o$) and the linear coefficient of thermal expansion at assembly ($\alpha_a$). Moreover, the inventors have found that the movement of the temperature sensitive material dominates the growth of the stator 220, and, accordingly, the linear coefficient of thermal expansion used for the ratio of thermal expansion ($R_\alpha$) is the linear coefficient of thermal expansion of the temperature sensitive material, such as the shape memory alloy (SMA). As noted above, the temperature sensitive material may a bimetallic couple comprising two metals having a relatively large difference in coefficients of thermal expansion. When a bimetallic couple is used as the temperature sensitive material, the linear coefficient of thermal expansion at operation ($\alpha_o$) and the linear coefficient of thermal expansion at assembly ($\alpha_a$) is the average of the linear coefficient of thermal expansion of each material used in the bimetallic couple at operation and at assembly, respectively.

Tables 1 to 3 describe exemplary embodiments 1 to 12. Each engine in the embodiments discussed of these tables is a high by-pass turbofan engine, such as the engine 100 of FIG. 2 described above, but each engine has different operating conditions and sizes, giving rise to different operating conditions that are used to determine the seal clearance gap at operation ($G_o$) and the linear coefficient of thermal expansion at operation ($\alpha_o$).

In the embodiments shown in Tables 1 to 3, the stator 220 includes a temperature sensitive material formed from a shape memory alloy. The shape memory alloy used in these embodiments is Nitinol®. Table 1 gives values used to calculate the seal clearance gap ratio at assembly ($G_a$) for the seal assembly 200 of each embodiment.

TABLE 1

| Emb. | Rotor Outside Diameter at Assembly (inches) | Stator Inside Diameter at Assembly (inches) | Seal Clearance Gap Ratio at Assembly ($G_a$) | Coefficient of Thermal Expansion at Assembly ($\alpha_a$) ($10^{-6}$/° F.) |
|---|---|---|---|---|
| 1 | 3.50 | 3.54 | 1.011 | 6.12 |
| 2 | 3.49 | 3.53 | 1.011 | 6.12 |
| 3 | 2.50 | 2.57 | 1.028 | 6.12 |
| 4 | 4.30 | 4.34 | 1.009 | 6.12 |
| 5 | 3.50 | 3.54 | 1.011 | 6.12 |
| 6 | 3.49 | 3.53 | 1.011 | 6.12 |
| 7 | 2.50 | 2.57 | 1.028 | 6.12 |
| 8 | 4.30 | 4.34 | 1.009 | 6.12 |
| 9 | 6.10 | 6.14 | 1.007 | 6.12 |
| 10 | 7.90 | 8.02 | 1.015 | 6.12 |
| 11 | 9.70 | 9.75 | 1.005 | 6.12 |
| 12 | 11.50 | 11.60 | 1.009 | 6.12 |

Table 2 gives the operating temperature and values used to calculate the seal clearance gap ratio at operation ($G_o$) for the seal assembly 200 of each embodiment.

TABLE 2

| Emb. | Operating Temperature (° F.) | Rotor Outside Diameter at Operation (inches) | Stator Inside Diameter at Operation (inches) | Seal Clearance Gap Ratio at Operation ($G_o$) | Coefficient of Thermal Expansion at Operation ($\alpha_o$) ($10^{-6}$/° F.) |
|---|---|---|---|---|---|
| 1 | 320 | 3.54 | 3.543 | 1.001 | 3.90 |
| 2 | 340 | 3.53 | 3.532 | 1.001 | 2.20 |
| 3 | 320 | 2.55 | 2.572 | 1.008 | 2.40 |
| 4 | 330 | 4.35 | 4.342 | 0.998 | 2.10 |
| 5 | 200 | 3.54 | 3.542 | 1.001 | 3.90 |
| 6 | 150 | 3.53 | 3.531 | 1.000 | 2.20 |
| 7 | 400 | 2.55 | 2.572 | 1.009 | 2.40 |
| 8 | 450 | 4.34 | 4.343 | 1.001 | 2.10 |
| 9 | 500 | 6.13 | 6.145 | 1.002 | 1.80 |
| 10 | 700 | 7.94 | 8.028 | 1.011 | 1.50 |
| 11 | 800 | 9.74 | 9.759 | 1.002 | 1.20 |
| 12 | 650 | 11.55 | 11.606 | 1.005 | 0.90 |

Table 3 gives values used to calculate the SCCR and also provides the resultant SCCR for each embodiment.

TABLE 3

| Emb. | Seal Clearance Gap Ratio at Assembly ($G_a$) | Seal Clearance Gap Ratio at Operation ($G_o$) | Ratio of Thermal Expansion ($R_\alpha$) | SCCR (%) |
|---|---|---|---|---|
| 1 | 1.011 | 1.001 | 0.64 | 36 |
| 2 | 1.011 | 1.001 | 0.36 | 64 |
| 3 | 1.028 | 1.008 | 0.39 | 60 |
| 4 | 1.009 | 0.998 | 0.34 | 65 |
| 5 | 1.011 | 1.001 | 0.64 | 36 |
| 6 | 1.011 | 1.000 | 0.36 | 64 |
| 7 | 1.028 | 1.009 | 0.39 | 60 |
| 8 | 1.009 | 1.001 | 0.34 | 65 |
| 9 | 1.007 | 1.002 | 0.29 | 70 |
| 10 | 1.015 | 1.011 | 0.25 | 75 |
| 11 | 1.005 | 1.002 | 0.20 | 80 |
| 12 | 1.009 | 1.005 | 0.15 | 85 |

Tables 4 to 6 describe exemplary embodiments 13 to 24. Each engine in the embodiments discussed of these tables is the same as a corresponding one of the exemplary embodiments 1 to 12 discussed above, and thus the rotor outside diameter at assembly, the stator inside diameter at assembly, the seal clearance gap ratio at assembly ($G_a$), the rotor outside diameter at operation, and the operating temperatures are the same between corresponding embodiments. The temperature sensitive material used in forming the stator 220 differs from the exemplary embodiments 1 to 12 discussed above. In the embodiments shown in Tables 4 to 6, the stator 220 includes a temperature sensitive material formed from a shape memory alloy. The shape memory alloy used in these embodiments is a nickel-titanium-hafnium shape memory alloy.

Table 4 gives values used to calculate the seal clearance gap ratio at assembly ($G_a$) for the seal assembly 200 of each embodiment.

TABLE 4

| Emb. | Rotor Outside Diameter at Assembly (inches) | Stator Inside Diameter at Assembly (inches) | Seal Clearance Gap Ratio at Assembly ($G_a$) | Coefficient of Thermal Expansion at Assembly ($\alpha_a$) ($10^{-6}$/° F.) |
|---|---|---|---|---|
| 13 | 3.50 | 3.54 | 1.011 | 5.36 |
| 14 | 3.49 | 3.53 | 1.011 | 5.36 |
| 15 | 2.50 | 2.57 | 1.028 | 5.36 |
| 16 | 4.30 | 4.34 | 1.009 | 5.36 |
| 17 | 3.50 | 3.54 | 1.011 | 5.36 |
| 18 | 3.49 | 3.53 | 1.011 | 5.36 |
| 19 | 2.50 | 2.57 | 1.028 | 5.36 |
| 20 | 4.30 | 4.34 | 1.009 | 5.36 |
| 21 | 6.10 | 6.14 | 1.007 | 5.36 |
| 22 | 7.90 | 8.02 | 1.015 | 5.36 |
| 23 | 9.70 | 9.75 | 1.005 | 5.36 |
| 24 | 11.50 | 11.60 | 1.009 | 5.36 |

Table 5 gives the operating temperature and values used to calculate the seal clearance gap ratio at operation ($G_o$) for the seal assembly 200 of each embodiment.

TABLE 5

| Emb. | Operating Temperature (° F.) | Rotor Outside Diameter at Operation (inches) | Stator Inside Diameter at Operation (inches) | Seal Clearance Gap Ratio at Operation ($G_o$) | Coefficient of Thermal Expansion at Operation ($\alpha_o$) ($10^{-6}$/° F.) |
|---|---|---|---|---|---|
| 13 | 320 | 3.54 | 3.542 | 1.000 | 1.72 |
| 14 | 340 | 3.53 | 3.532 | 1.001 | 2.48 |
| 15 | 320 | 2.55 | 2.571 | 1.008 | 2.09 |
| 16 | 330 | 4.35 | 4.344 | 0.999 | 3.17 |
| 17 | 200 | 3.54 | 3.541 | 1.000 | 1.29 |
| 18 | 150 | 3.53 | 3.530 | 1.000 | 1.55 |
| 19 | 400 | 2.55 | 2.571 | 1.008 | 0.91 |
| 20 | 450 | 4.34 | 4.342 | 1.000 | 1.02 |
| 21 | 500 | 6.13 | 6.144 | 1.002 | 1.55 |
| 22 | 700 | 7.94 | 8.032 | 1.012 | 2.41 |
| 23 | 800 | 9.74 | 9.766 | 1.003 | 2.20 |
| 24 | 650 | 11.55 | 11.621 | 1.006 | 3.16 |

Table 6 gives values used to calculate the SCCR and also provides the resultant SCCR for each embodiment.

TABLE 6

| Emb. | Seal Clearance Gap Ratio at Assembly ($G_a$) | Seal Clearance Gap Ratio at Operation ($G_o$) | Ratio of Thermal Expansion ($R_\alpha$) | SCCR (%) |
|---|---|---|---|---|
| 13 | 1.011 | 1.000 | 0.32 | 68 |
| 14 | 1.011 | 1.001 | 0.46 | 53 |
| 15 | 1.028 | 1.008 | 0.39 | 60 |
| 16 | 1.009 | 0.999 | 0.59 | 40 |
| 17 | 1.011 | 1.000 | 0.24 | 76 |
| 18 | 1.011 | 1.000 | 0.29 | 71 |
| 19 | 1.028 | 1.008 | 0.17 | 83 |
| 20 | 1.009 | 1.000 | 0.19 | 81 |
| 21 | 1.007 | 1.002 | 0.29 | 71 |
| 22 | 1.015 | 1.012 | 0.45 | 55 |
| 23 | 1.005 | 1.003 | 0.41 | 59 |
| 24 | 1.009 | 1.006 | 0.59 | 41 |

Tables 7 to 9 describe exemplary embodiments 25 to 36. Each engine in the embodiments discussed of these tables is the same as a corresponding one of the exemplary embodiments 1 to 12 discussed above, and thus the rotor outside diameter at assembly, the stator inside diameter at assembly, the seal clearance gap ratio at assembly ($G_a$), the rotor outside diameter at operation, and the operating temperatures are the same between corresponding embodiments. The temperature sensitive material used in forming the stator 220 differs from the exemplary embodiments 1 to 12 and also exemplary embodiments 13 to 24 discussed above. In the embodiments shown in Tables 7 to 9, the stator 220 includes a temperature sensitive material formed from a shape memory alloy. The shape memory alloy used in these embodiments is a nickel-titanium-palladium shape memory alloy.

Table 7 gives values used to calculate the seal clearance gap ratio at assembly ($G_a$) for the seal assembly 200 of each embodiment.

TABLE 7

| Emb. | Rotor Outside Diameter at Assembly (inches) | Stator Inside Diameter at Assembly (inches) | Seal Clearance Gap Ratio at Assembly ($G_a$) | Coefficient of Thermal Expansion at Assembly ($\alpha_a$) ($10^{-6}/°$ F.) |
|---|---|---|---|---|
| 25 | 3.50 | 3.54 | 1.011 | 7.23 |
| 26 | 3.49 | 3.53 | 1.011 | 7.23 |
| 27 | 2.50 | 2.57 | 1.028 | 7.23 |
| 28 | 4.30 | 4.34 | 1.009 | 7.23 |
| 29 | 3.50 | 3.54 | 1.011 | 7.23 |
| 30 | 3.49 | 3.53 | 1.011 | 7.23 |
| 31 | 2.50 | 2.57 | 1.028 | 7.23 |
| 32 | 4.30 | 4.34 | 1.009 | 7.23 |
| 33 | 6.10 | 6.14 | 1.007 | 7.23 |
| 34 | 7.90 | 8.02 | 1.015 | 7.23 |
| 35 | 9.70 | 9.75 | 1.005 | 7.23 |
| 36 | 11.50 | 11.60 | 1.009 | 7.23 |

Table 8 gives the operating temperature and values used to calculate the seal clearance gap ratio at operation ($G_o$) for the seal assembly 200 of each embodiment.

TABLE 8

| Emb. | Operating Temperature (° F.) | Rotor Outside Diameter at Operation (inches) | Stator Inside Diameter at Operation (inches) | Seal Clearance Gap Ratio at Operation ($G_o$) | Coefficient of Thermal Expansion at Operation ($\alpha_o$) ($10^{-6}/°$ F.) |
|---|---|---|---|---|---|
| 25 | 320 | 3.54 | 3.544 | 1.001 | 3.98 |
| 26 | 340 | 3.53 | 3.533 | 1.001 | 2.96 |
| 27 | 320 | 2.55 | 2.572 | 1.009 | 2.68 |
| 28 | 330 | 4.35 | 4.344 | 0.999 | 3.54 |
| 29 | 200 | 3.54 | 3.541 | 1.000 | 1.52 |
| 30 | 150 | 3.53 | 3.531 | 1.000 | 2.02 |
| 31 | 400 | 2.55 | 2.572 | 1.008 | 1.88 |
| 32 | 450 | 4.34 | 4.342 | 1.000 | 1.23 |
| 33 | 500 | 6.13 | 6.150 | 1.003 | 3.98 |
| 34 | 700 | 7.94 | 8.035 | 1.012 | 2.96 |
| 35 | 800 | 9.74 | 9.769 | 1.003 | 2.68 |
| 36 | 650 | 11.55 | 11.624 | 1.006 | 3.62 |

Table 9 gives values used to calculate the SCCR and also provides the resultant SCCR for each embodiment.

TABLE 9

| Emb. | Seal Clearance Gap Ratio at Assembly ($G_a$) | Seal Clearance Gap Ratio at Operation ($G_o$) | Ratio of Thermal Expansion ($R_\alpha$) | SCCR (%) |
|---|---|---|---|---|
| 25 | 1.011 | 1.001 | 0.55 | 44 |
| 26 | 1.011 | 1.001 | 0.41 | 59 |
| 27 | 1.028 | 1.009 | 0.37 | 62 |
| 28 | 1.009 | 0.999 | 0.49 | 51 |
| 29 | 1.011 | 1.000 | 0.21 | 79 |
| 30 | 1.011 | 1.000 | 0.28 | 72 |
| 31 | 1.028 | 1.008 | 0.26 | 73 |
| 32 | 1.009 | 1.000 | 0.17 | 83 |
| 33 | 1.007 | 1.003 | 0.55 | 45 |
| 34 | 1.015 | 1.012 | 0.41 | 59 |
| 35 | 1.005 | 1.003 | 0.37 | 63 |
| 36 | 1.009 | 1.006 | 0.50 | 50 |

Tables 10 to 12 describe exemplary embodiments 37 to 48. Each engine in the embodiments discussed of these tables is the same as a corresponding one of the exemplary embodiments 1 to 12 discussed above, and thus the rotor outside diameter at assembly, the stator inside diameter at assembly, the seal clearance gap ratio at assembly ($G_a$), the rotor outside diameter at operation, and the operating temperatures are the same between corresponding embodiments. The temperature sensitive material used in forming the stator 220 differs from the exemplary embodiments discussed above. In the embodiments shown in Tables 10 to 12, the stator 220 includes a temperature sensitive material formed from a bimetallic layer. The materials used in these embodiments to form the bimetallic are steel and aluminum.

Table 10 gives values used to calculate the seal clearance gap ratio at assembly ($G_a$) for the seal assembly 200 of each embodiment.

TABLE 10

| Emb. | Rotor Outside Diameter at Assembly (inches) | Stator Inside Diameter at Assembly (inches) | Seal Clearance Gap Ratio at Assembly ($G_a$) | Coefficient of Thermal Expansion at Assembly ($\alpha_a$) ($10^{-6}/°$ F.) |
|---|---|---|---|---|
| 37 | 3.50 | 3.54 | 1.011 | 9.00 |
| 38 | 3.49 | 3.53 | 1.011 | 9.00 |
| 39 | 2.50 | 2.57 | 1.028 | 9.00 |
| 40 | 4.30 | 4.34 | 1.009 | 9.00 |
| 41 | 3.50 | 3.54 | 1.011 | 9.00 |
| 42 | 3.49 | 3.53 | 1.011 | 9.00 |
| 43 | 2.50 | 2.57 | 1.028 | 9.00 |
| 44 | 4.30 | 4.34 | 1.009 | 9.00 |
| 45 | 6.10 | 6.14 | 1.007 | 9.00 |
| 46 | 7.90 | 8.02 | 1.015 | 9.00 |
| 47 | 9.70 | 9.75 | 1.005 | 9.00 |
| 48 | 11.50 | 11.60 | 1.009 | 9.00 |

Table 11 gives the operating temperature and values used to calculate the seal clearance gap ratio at operation ($G_o$) for the seal assembly 200 of each embodiment.

TABLE 11

| Emb. | Operating Temperature (° F.) | Rotor Outside Diameter at Operation (inches) | Stator Inside Diameter at Operation (inches) | Seal Clearance Gap Ratio at Operation ($G_o$) | Coefficient of Thermal Expansion at Operation ($\alpha_o$) ($10^{-6}/°$ F.) |
|---|---|---|---|---|---|
| 37 | 320 | 3.54 | 3.546 | 1.002 | 7.11 |
| 38 | 340 | 3.53 | 3.537 | 1.002 | 7.11 |
| 39 | 320 | 2.55 | 2.575 | 1.010 | 7.11 |
| 40 | 330 | 4.35 | 4.348 | 1.000 | 7.11 |
| 41 | 200 | 3.54 | 3.543 | 1.001 | 7.11 |
| 42 | 150 | 3.53 | 3.532 | 1.001 | 7.11 |
| 43 | 400 | 2.55 | 2.576 | 1.010 | 7.11 |
| 44 | 450 | 4.34 | 4.352 | 1.003 | 7.11 |
| 45 | 500 | 6.13 | 6.159 | 1.005 | 7.11 |
| 46 | 700 | 7.94 | 8.056 | 1.015 | 7.11 |
| 47 | 800 | 9.74 | 9.801 | 1.006 | 7.11 |
| 48 | 650 | 11.55 | 11.648 | 1.008 | 7.11 |

Table 12 gives values used to calculate the SCCR and also provides the resultant SCCR for each embodiment.

TABLE 12

| Emb. | Seal Clearance Gap Ratio at Assembly ($G_a$) | Seal Clearance Gap Ratio at Operation ($G_o$) | Ratio of Thermal Expansion ($R_\alpha$) | SCCR (%) |
|---|---|---|---|---|
| 37 | 1.011 | 1.002 | 0.79 | 20 |
| 38 | 1.011 | 1.002 | 0.79 | 20 |
| 39 | 1.028 | 1.010 | 0.79 | 20 |
| 40 | 1.009 | 1.000 | 0.79 | 20 |
| 41 | 1.011 | 1.001 | 0.79 | 20 |
| 42 | 1.011 | 1.001 | 0.79 | 20 |
| 43 | 1.028 | 1.010 | 0.79 | 20 |
| 44 | 1.009 | 1.003 | 0.79 | 21 |
| 45 | 1.007 | 1.005 | 0.79 | 21 |
| 46 | 1.015 | 1.015 | 0.79 | 21 |
| 47 | 1.005 | 1.006 | 0.79 | 21 |
| 48 | 1.009 | 1.008 | 0.79 | 21 |

Tables 13 to 15 describe exemplary embodiments 49 to 60. Each engine in the embodiments discussed of these tables is the same as a corresponding one of the exemplary embodiments 1 to 12 discussed above, and thus the rotor outside diameter at assembly, the stator inside diameter at assembly, the seal clearance gap ratio at assembly ($G_a$), the rotor outside diameter at operation, and the operating temperatures are the same between corresponding embodiments. The temperature sensitive material used in forming the stator 220 differs from the exemplary embodiments discussed above. In the embodiments shown in Tables 13 to 15, the stator 220 includes a temperature sensitive material formed from a bimetallic layer. The materials used in these embodiments to form the bimetallic are Inconel® and titanium.

Table 13 gives values used to calculate the seal clearance gap ratio at assembly ($G_a$) for the seal assembly 200 of each embodiment.

TABLE 13

| Emb. | Rotor Outside Diameter at Assembly (inches) | Stator Inside Diameter at Assembly (inches) | Seal Clearance Gap Ratio at Assembly ($G_a$) | Coefficient of Thermal Expansion at Assembly ($\alpha_a$) ($10^{-6}/°$ F.) |
|---|---|---|---|---|
| 37 | 3.50 | 3.54 | 1.011 | 5.75 |
| 38 | 3.49 | 3.53 | 1.011 | 5.75 |
| 39 | 2.50 | 2.57 | 1.028 | 5.75 |
| 40 | 4.30 | 4.34 | 1.009 | 5.75 |
| 41 | 3.50 | 3.54 | 1.011 | 5.75 |
| 42 | 3.49 | 3.53 | 1.011 | 5.75 |
| 43 | 2.50 | 2.57 | 1.028 | 5.75 |
| 44 | 4.30 | 4.34 | 1.009 | 5.75 |
| 45 | 6.10 | 6.14 | 1.007 | 5.75 |
| 46 | 7.90 | 8.02 | 1.015 | 5.75 |
| 47 | 9.70 | 9.75 | 1.005 | 5.75 |
| 48 | 11.50 | 11.60 | 1.009 | 5.75 |

Table 14 gives the operating temperature and values used to calculate the seal clearance gap ratio at operation ($G_o$) for the seal assembly 200 of each embodiment.

TABLE 14

| Emb. | Operating Temperature (° F.) | Rotor Outside Diameter at Operation (inches) | Stator Inside Diameter at Operation (inches) | Seal Clearance Gap Ratio at Operation ($G_o$) | Coefficient of Thermal Expansion at Operation ($\alpha_o$) ($10^{-6}/°$ F.) |
|---|---|---|---|---|---|
| 37 | 320 | 3.54 | 3.544 | 1.001 | 4.43 |
| 38 | 340 | 3.53 | 3.534 | 1.001 | 4.43 |
| 39 | 320 | 2.55 | 2.573 | 1.009 | 4.43 |
| 40 | 330 | 4.35 | 4.345 | 0.999 | 4.43 |
| 41 | 200 | 3.54 | 3.542 | 1.001 | 4.43 |
| 42 | 150 | 3.53 | 3.531 | 1.000 | 4.43 |
| 43 | 400 | 2.55 | 2.574 | 1.009 | 4.43 |
| 44 | 450 | 4.34 | 4.347 | 1.002 | 4.43 |
| 45 | 500 | 6.13 | 6.152 | 1.004 | 4.43 |
| 46 | 700 | 7.94 | 8.042 | 1.013 | 4.43 |
| 47 | 800 | 9.74 | 9.782 | 1.004 | 4.43 |
| 48 | 650 | 11.55 | 11.630 | 1.007 | 4.43 |

Table 15 gives values used to calculate the SCCR and also provides the resultant SCCR for each embodiment.

TABLE 15

| Emb. | Seal Clearance Gap Ratio at Assembly ($G_a$) | Seal Clearance Gap Ratio at Operation ($G_o$) | Ratio of Thermal Expansion ($R_\alpha$) | SCCR (%) |
|---|---|---|---|---|
| 37 | 1.011 | 1.001 | 0.77 | 22 |
| 38 | 1.011 | 1.001 | 0.77 | 22 |
| 39 | 1.028 | 1.009 | 0.77 | 22 |
| 40 | 1.009 | 0.999 | 0.77 | 22 |
| 41 | 1.011 | 1.001 | 0.77 | 22 |
| 42 | 1.011 | 1.000 | 0.77 | 22 |
| 43 | 1.028 | 1.009 | 0.77 | 22 |
| 44 | 1.009 | 1.002 | 0.77 | 22 |
| 45 | 1.007 | 1.004 | 0.77 | 23 |
| 46 | 1.015 | 1.013 | 0.77 | 23 |
| 47 | 1.005 | 1.004 | 0.77 | 23 |
| 48 | 1.009 | 1.007 | 0.77 | 23 |

As discussed above, the seal clearance gap ratio at assembly ($G_a$) is an indicator of the clearance of the seal assembly 200 and the size of the gap G. A seal clearance gap ratio at assembly ($G_a$) of one (1) would indicate that there is no gap G and the teeth 218 are contacting the stator seal face 224. Accordingly, the seal clearance gap ratio at assembly ($G_a$) is preferably greater than one (1). As noted above in the discussion of FIGS. 13A and 13B, the gap G decreases with increasing operating temperature and speed even with the seal assembly 200 of the embodiments discussed herein. The seal clearance gap ratio at assembly ($G_a$) is thus preferably one (1.00) or greater to account for this reduction in gap G from assembly to operation. For the seal assembly 200 to operate as a seal the gap G cannot be too great, otherwise, the seal assembly 200 does not sufficiently prevent the flow of fluids between the rotor 210 and the stator seal body 222. The seal clearance gap ratio at assembly ($G_a$) is, thus, preferably one and two tenths (1.2) or less to provide a minimal sealing capability, and the seal clearance gap ratio at assembly ($G_a$) is more preferably one and one tenth (1.1) or less to provide a more optimal sealing capacity. With the seal assembly 200 using the temperature sensitive material in the rotor 210 or stator 220, the seal design does not have to accommodate large changes in gap G over the operational range of the seal assembly 200, allowing the seal clearance gap ratio at assembly ($G_a$) to have much tighter clearances such as one and five hundredths (1.05) or less, or such as one and three hundredths (1.03) or less (as in the example embodiments shown in Tables 1 to 3). Accordingly, the seal clearance gap ratio at assembly ($G_a$) is preferably greater than one (1) and one and two tenths (1.2) or less, more preferably, from one (1.00) to one and one tenth (1.1).

The seal clearance gap ratio at operation ($G_o$) is also an indicator of the clearance of the seal assembly 200 and the size of the gap G. Considerations for the seal clearance gap ratio at operation ($G_o$) are similar to those for the seal clearance gap ratio at assembly ($G_a$), but, at operation, further reductions in the gap G may not need to be accommodated. Accordingly, the seal clearance gap ratio at operation ($G_o$) is preferably greater than one (1) and two tenths (1.2) or less, more preferably, greater than one (1) one and one and one tenth (1.1) or less.

The ratio of thermal expansion ($R_\alpha$) relates to the amount of movement of a component of the seal assembly 200 that includes the temperature sensitive material, which in the embodiments discussed above, is the stator 220. The ratio of thermal expansion ($R_\alpha$) is preferably greater than one (1), otherwise the temperature sensitive material (e.g., the shape memory alloy) has no impact on growth of the stator 220. Movements that are too great, however, may introduce other problems such as high stress on the stator seal body 222 or cause fatigue. To avoid such issues, the ratio of thermal expansion ($R_\alpha$) is preferably three (3) or less, and, more preferably, two (2) or less. The ratio of thermal expansion ($R_\alpha$), thus, is greater than one (1) and three (3) or less and, more preferably, greater than one (1) and two (2) or less.

Figure 14:
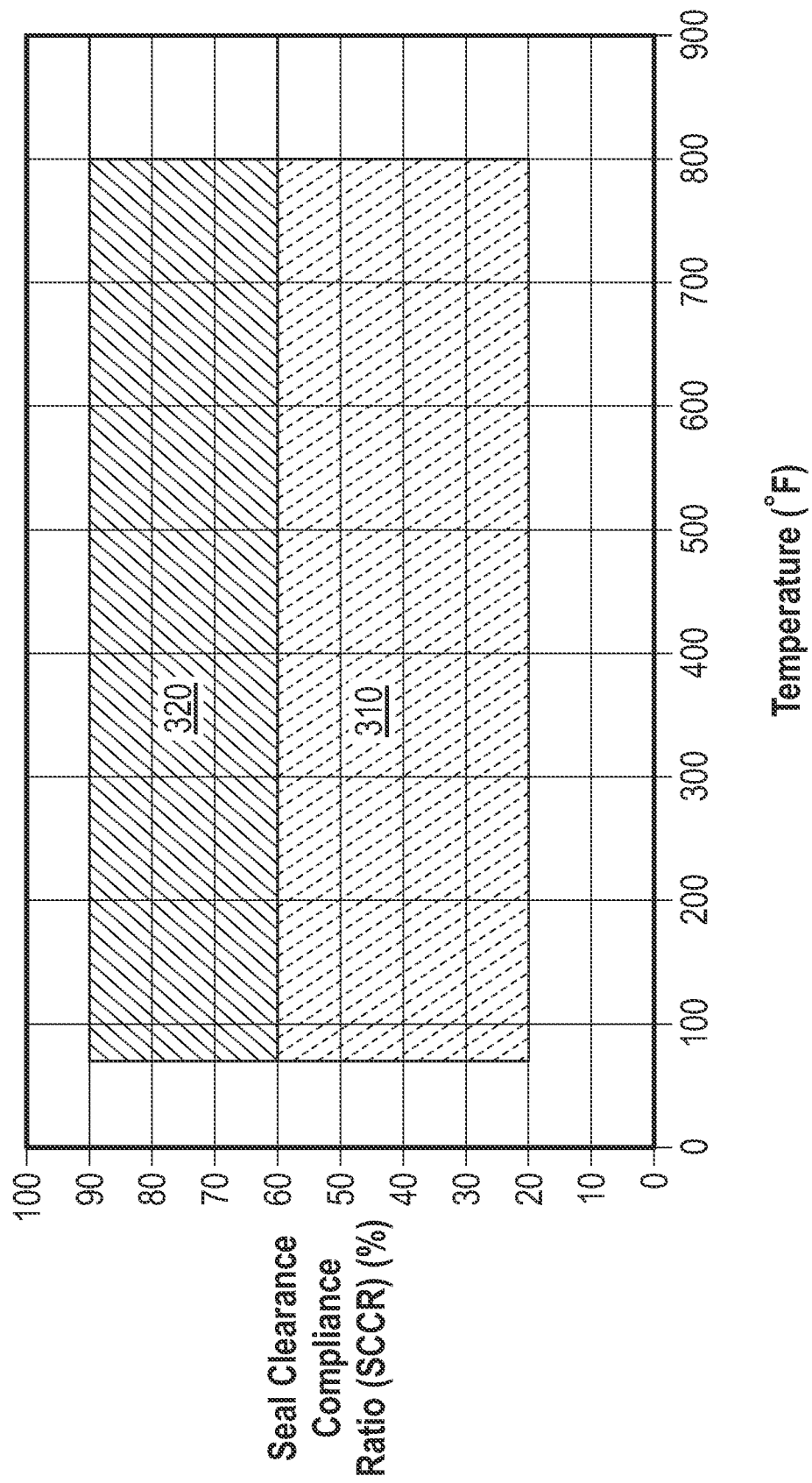
FIG. 14 is graph illustrating a seal clearance compliance ratio (SCCR) relative to operating temperature of the seal assembly, according to embodiments of the present disclosure.

In FIG. 14, one set of preferred boundaries for the SCCR is shown by an area 310. The SCCR is preferably from twenty percent (20%) to ninety percent (90%). The SCCR has a rough correspondence to the size of the gap G at operation to the size of the gap G at assembly in terms of percent. Ideally, the gap G would be constant, such as a SCCR near 100%, for the entire operating condition. The inventors have found, however, that such a design is overly complex. Instead, an SCCR of ninety percent (90%) or less provides a good balance of complexity while maintaining only small changes in the gap G. For the reasons noted above, large changes in the gap G are undesirable and, thus, the inventors prefer that the SCCR is twenty percent (20%) or greater.

As noted above, the gap G is preferably more constant over the operating temperature ranges, and, thus, the SCCR is preferable at the upper end of the range discussed above. The inventors have found that seal assembly 200 designs with an SCCR of sixty percent (60%) or greater are more effective. The SCCR is more preferably from sixty percent (60%) to ninety percent (90%) as shown by an area 320.

FIG. 14 shows the SCCR relative to the operating temperature of the seal assembly 200. While the operating temperature is not an explicit parameter of relationship (1), the operating temperature is used to determine the various factors discussed above. The seal assemblies 200 discussed herein preferably have operational temperatures from ambient temperatures (seventy degrees Fahrenheit (70° F.)) (twenty-one degrees Celsius (21 ° C.)) to eight hundred degrees Fahrenheit (800° F.) (four hundred twenty-seven degrees Celsius (427 ° C.)). The inventors have found that seal assembly 200 having an SCCR within the ranges discussed herein are particularly effective for operational temperatures from two hundred degrees Fahrenheit (200° F.) (ninety-three degrees Celsius (93° C.)) to four hundred degrees Fahrenheit (400° F.) (two hundred five degrees Celsius (205° C.)). Low operating temperatures (at ambient or below) do not exhibit much change in dimensions over the operational range, and, thus such seal assembly 200 may not benefit from the seal assembly 200 discussed herein.

High operating temperatures can result in significant changes in dimension and movement of the rotor 210 and the stator 220, even with the preferred ranges discussed above. To avoid this movement, the seal assembly 200 discussed herein is preferably used in operating temperatures of eight hundred degrees Fahrenheit (800° F.) (four hundred twenty-seven degrees Celsius (427 ° C.)) or less and, more preferably, four hundred degrees Fahrenheit (400° F.) (two hundred five degrees Celsius (205° C.)) or less.

Further aspects of the present disclosure are provided by the subject matter of the following clauses.

A seal assembly for a rotary machine, the seal assembly comprises a rotor rotatable about a rotational axis and having a rotor seal face, and a stator having a stator seal face, the stator seal face being positioned opposite the rotor seal face, the stator seal face facing the rotor seal face with a gap therebetween, a portion of one of the rotor and the stator being formed of (i) a shape memory alloy or (ii) a first metal and a second metal, the second metal having a coefficient of thermal expansion different from the first metal, and the seal assembly being characterized by a seal clearance compliance ratio (SCCR) from 20% to 90%. The SCCR is given by:

$$SCCR = \left(1 - \left(\frac{G_a}{G_o} \times R_\alpha\right)\right) \times 100\%,$$

where $G_a$ is a seal clearance gap ratio at assembly, $G_o$ is a seal clearance gap ratio at operation, and $R_\alpha$ is a ratio of thermal expansion.

The seal assembly of the preceding clause, the SCCR being from 60% to 90%.

The seal assembly of any preceding clause, the seal assembly having an operating temperature, the operating temperature being from 70° F. to 800° F.

The seal assembly of any preceding clause, the operating temperature being from 200° F. to 400° F.

The seal assembly of any preceding clause, the seal clearance gap ratio at assembly ($G_a$) being from 1 to 1.2.

The seal assembly of any preceding clause, the seal clearance gap ratio at assembly ($G_a$) being from 1.0 to 1.1.

The seal assembly of any preceding clause, the seal clearance gap ratio at operation ($G_o$) being from 1 to 1.2.

The seal assembly of any preceding clause, the seal clearance gap ratio at operation ($G_o$) being from 1 to 1.1.

The seal assembly of any preceding clause, the seal assembly being characterized by a ratio of thermal expansion ($R_\alpha$) from 1 to 3.

The seal assembly of any preceding clause, the ratio of thermal expansion ($R_\alpha$) being from 1 to 2.

The seal assembly of any preceding clause, the rotor including a plurality of teeth extending from the rotor seal face in a direction towards the stator seal face.

The seal assembly of any preceding clause, each tooth of the plurality of teeth having a tip, the gap being defined between the tips of the teeth and the stator seal face.

The seal assembly of any preceding clause, the stator including an abradable material layer positioned opposite the plurality of teeth of the rotor, the stator seal face being formed on a surface of the abradable material layer.

The seal assembly of any preceding clause, the abradable material layer being formed from the shape memory alloy.

The seal assembly of any preceding clause, the abradable material layer having a lattice structure.

The seal assembly of any preceding clause, the rotor including a rotor seal body, the rotor seal face being formed on the rotor seal body, and the stator including a stator seal body, the stator seal face being formed on the stator seal body.

The seal assembly of any preceding clause, at least a portion of one of the rotor seal body and the stator seal body being formed of (i) the shape memory alloy or (ii) the first metal and the second metal.

The seal assembly of any preceding clause, the shape memory alloy or the first metal and the second metal being positioned within the one of the rotor seal body and the stator seal body to move one of the rotor seal face and the stator seal face towards or away from the other one of the rotor seal face and the stator seal face.

The seal assembly of any preceding clause, the rotor having a radial direction, and the shape memory alloy or the first metal and the second metal being positioned within the one of the rotor seal body and the stator seal body to move one of the rotor seal face and the stator seal face in the radial direction.

The seal assembly of any preceding clause, the rotor seal body including a plurality of teeth extending from the rotor seal face in a direction towards the stator seal face.

The seal assembly of any preceding clause, each tooth of the plurality of teeth having a tip, the gap being defined between the tips of the teeth and the stator seal face.

The seal assembly of any preceding clause, the stator including an abradable material layer positioned opposite the plurality of teeth of the rotor, the stator seal face being formed on a surface of the abradable material layer.

The seal assembly of any preceding clause, the abradable material layer being formed from the shape memory alloy.

The seal assembly of any preceding clause, the abradable material layer having a lattice structure.

The seal assembly of any preceding clause, at least a portion of the stator seal body being formed of (i) the shape memory alloy or (ii) the first metal and the second metal.

The seal assembly of any preceding clause, the stator seal body being formed of the shape memory alloy.

The seal assembly of any preceding clause, the stator including an abradable material layer connected to the stator seal body, the stator seal face being formed on a surface of the abradable material layer.

The seal assembly of any preceding clause, the stator seal body including a spring positioned to move the stator seal face towards or away from the rotor seal face, the spring being formed of (i) the shape memory alloy or (ii) the first metal and the second metal.

The seal assembly of any preceding clause, the stator seal body including an inner portion and an outer portion, the stator seal face being formed on the inner portion of the stator seal body, and the spring being positioned to move the inner portion relative to the outer portion.

The seal assembly of any preceding clause, the inner portion being connected to the outer portion by the spring.

The seal assembly of any preceding clause, the stator seal body further including a connecting portion connecting the inner portion to the outer portion.

The seal assembly of any preceding clause, the stator seal body being C-shaped.

The seal assembly of any preceding clause, the stator seal body including a temperature sensitive material layer, the temperature sensitive material layer being formed of (i) the shape memory alloy or (ii) the first metal and the second metal.

The seal assembly of any preceding clause, the temperature sensitive material layer including a plurality of axial segments.

The seal assembly of any preceding clause, the axial segments of the plurality of axial segments having different coefficients of thermal expansion at operation from each other.

The seal assembly of any preceding clause, the temperature sensitive material layer including a plurality of radial segments.

The seal assembly of any preceding clause, the radial segments of the temperature sensitive material layer having different coefficients of thermal expansion at operation from each other.

The seal assembly of any preceding clause, the stator seal body including an inner portion and an outer portion, the stator seal face being formed on the inner portion of the stator seal body, the temperature sensitive material layer being positioned to move the inner portion relative to the outer portion.

The seal assembly of any preceding clause, the stator seal body further including a connecting portion connecting the inner portion to the outer portion.

The seal assembly of any preceding clause, the stator seal body being C-shaped.

The seal assembly of any preceding clause, the temperature sensitive material layer being positioned between the inner portion and the outer portion.

The seal assembly of any preceding clause, further comprising a temperature regulating system configured to regulate a temperature of the stator seal body.

The seal assembly of any preceding clause, the temperature regulating system being configured to regulate the temperature of (i) the shape memory alloy or (ii) the first metal and the second metal.

The seal assembly of any preceding clause, the temperature regulating system including at least one nozzle positioned to direct a fluid on to the stator seal body.

The seal assembly of any preceding clause, the temperature regulating system including a jacket defining a fluid channel, the jacket being in thermal contact with the stator seal body, and as a fluid flows in and through the fluid channel, the fluid regulates the temperature of the stator seal body.

A rotary machine comprising the seal assembly of any preceding clause, and a controller that is configured to control the temperature of the stator seal body by controlling the temperature regulating system.

The rotary machine of any preceding clause, further comprising a gap sensor configured to determine a distance between the rotor seal face and the stator seal body, the controller being communicatively coupled to the gap sensor to receive gap information from the gap sensor and the controller being configured to control the temperature of the stator seal body based on the gap information received from the gap sensor.

The rotary machine of any preceding clause, further comprising a fluid source and a flow control device connected to the fluid source to control a flow of the fluid therefrom, the controller being operatively coupled to the flow control device to control the flow of the fluid.

A rotary machine comprising the seal assembly of any preceding clause.

A gas turbine engine comprising the rotary machine comprising the rotary machine of any preceding clause.

The gas turbine engine of any preceding clause, the rotary machine being a turbomachine. Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A seal assembly for a rotary machine, the seal assembly comprising:
   a rotor rotatable about a rotational axis and having a rotor seal face; and
   a stator having a stator seal face, the stator seal face being positioned opposite the rotor seal face, the stator seal face facing the rotor seal face with a gap therebetween, wherein a portion of one of the rotor and the stator is formed of (i) a shape memory alloy or (ii) a first metal and a second metal, the second metal having a coefficient of thermal expansion different from the first metal, and
   wherein the seal assembly is characterized by a seal clearance compliance ratio (SCCR) from 20% to 90%, the SCCR being given by:

$$SCCR = \left(1 - \left(\frac{G_a}{G_o} \times R_\alpha\right)\right) \times 100\%,$$

where $G_a$ is a seal clearance gap ratio at assembly, $G_o$ is a seal clearance gap ratio at operation, and $R_\alpha$ is a ratio of thermal expansion.

2. The seal assembly of claim 1, wherein the SCCR is from 60% to 90%.

3. The seal assembly of claim 1, wherein the seal assembly has an operating temperature, the operating temperature being from 70° F. to 800° F.

4. The seal assembly of claim 3, wherein the operating temperature is from 200° F. to 400° F.

5. The seal assembly of claim 1, wherein the seal clearance gap ratio at assembly ($G_a$) is from 1 to 1.2.

6. The seal assembly of claim 5, wherein the seal clearance gap ratio at assembly ($G_a$) is from 1.0 to 1.1.

7. The seal assembly of claim 1, wherein the seal clearance gap ratio at operation ($G_o$) is from 1 to 1.2.

8. The seal assembly of claim 7, wherein the seal clearance gap ratio at operation ($G_o$) is from 1 to 1.1.

9. The seal assembly of claim 1, wherein the ratio of thermal expansion ($R_\alpha$) is from 1 to 3.

10. The seal assembly of claim 9, wherein the ratio of thermal expansion ($R_\alpha$) is from 1 to 2.

11. The seal assembly of claim 1, wherein the rotor includes a plurality of teeth extending from the rotor seal face in a direction towards the stator seal face, each tooth of the plurality of teeth having a tip, the gap being defined between the tips and the stator seal face.

12. The seal assembly of claim 11, wherein the stator includes an abradable material layer positioned opposite the plurality of teeth of the rotor, the stator seal face being formed on a surface of the abradable material layer, the abradable material layer being formed from the shape memory alloy.

13. The seal assembly of claim 1, wherein the rotor includes a rotor seal body, the rotor seal face being formed on the rotor seal body, and
   wherein the stator includes a stator seal body, the stator seal face being formed on the stator seal body.

14. The seal assembly of claim 13, wherein the stator seal body includes a spring positioned to move the stator seal face towards or away from the rotor seal face, the spring being formed of (i) the shape memory alloy or (ii) the first metal and the second metal.

15. The seal assembly of claim 13, wherein at least a portion of the stator seal body is formed of (i) the shape memory alloy or (ii) the first metal and the second metal.

16. The seal assembly of claim 15, further comprising a temperature regulating system configured to regulate a temperature of (i) the shape memory alloy or (ii) the first metal and the second metal.

17. The seal assembly of claim 15, wherein the stator seal body includes a temperature sensitive material layer, the temperature sensitive material layer being formed of (i) the shape memory alloy or (ii) the first metal and the second metal.

18. The seal assembly of claim 17, wherein the temperature sensitive material layer includes a plurality of axial segments.

19. The seal assembly of claim 17, wherein the temperature sensitive material layer includes a plurality of radial segments.

20. A gas turbine engine comprising a turbomachine that includes the seal assembly of claim 1.

* * * * *